United States Patent
Disko et al.

(10) Patent No.: US 10,724,363 B2
(45) Date of Patent: Jul. 28, 2020

(54) METHOD AND SYSTEM FOR PERFORMING HYDROCARBON OPERATIONS WITH MIXED COMMUNICATION NETWORKS

(71) Applicants: Mark M. Disko, Glen Gardner, NJ (US); Xiaohua Yi, Houston, TX (US); Scott W. Clawson, Califon, NJ (US)

(72) Inventors: Mark M. Disko, Glen Gardner, NJ (US); Xiaohua Yi, Houston, TX (US); Scott W. Clawson, Califon, NJ (US)

(73) Assignee: ExxonMobil Upstream Research Company, Spring, TX (US)

( * ) Notice: Subject to any disclaimer, the term of this patent is extended or adjusted under 35 U.S.C. 154(b) by 0 days.

(21) Appl. No.: 16/139,384

(22) Filed: Sep. 24, 2018

(65) Prior Publication Data

US 2019/0112915 A1   Apr. 18, 2019

Related U.S. Application Data

(60) Provisional application No. 62/572,211, filed on Oct. 13, 2017.

(51) Int. Cl.
| | | |
|---|---|---|
| *E21B 47/14* | (2006.01) | |
| *H04B 11/00* | (2006.01) | |
| *H04B 13/00* | (2006.01) | |
| *E21B 47/12* | (2012.01) | |

(Continued)

(52) U.S. Cl.
CPC ............. *E21B 47/14* (2013.01); *E21B 47/12* (2013.01); *E21B 47/122* (2013.01); *G01V 1/44* (2013.01); *G01V 3/30* (2013.01); *H04B 11/00* (2013.01); *H04B 13/00* (2013.01)

(58) Field of Classification Search
CPC ........ E21B 47/14; E21B 47/12; E21B 47/122; G01V 1/44; G01V 3/30; H04B 11/00; H04B 13/00
See application file for complete search history.

(56) References Cited

U.S. PATENT DOCUMENTS

| | | | |
|---|---|---|---|
| 3,103,643 A | 9/1963 | Kalbfell | 340/17 |
| 3,205,477 A | 9/1965 | Kalbfell | 340/18 |
| 3,512,407 A | 5/1970 | Zill | 73/152 |

(Continued)

FOREIGN PATENT DOCUMENTS

| | | | |
|---|---|---|---|
| CN | 102733799 | 6/2014 | E21B 47/16 |
| EP | 0636763 | 2/1995 | E21B 47/12 |

(Continued)

OTHER PUBLICATIONS

U.S. Appl. No. 15/666,334, filed Aug. 1, 2017, Walker, Katie M. et al.

(Continued)

*Primary Examiner* — Amine Benlagsir
(74) *Attorney, Agent, or Firm* — ExxonMobil Upstream Research Company-Law Department

(57) ABSTRACT

A method and system are described for using different types of communication networks along one or more tubular members. The method includes constructing a communication network along one or more tubular members, which may access a subsurface region and using the communication network in hydrocarbon operations, such as hydrocarbon exploration, hydrocarbon development, and/or hydrocarbon production.

38 Claims, 6 Drawing Sheets

(51) Int. Cl.
*G01V 1/44* (2006.01)
*G01V 3/30* (2006.01)

(56) References Cited

U.S. PATENT DOCUMENTS

| | | | |
|---|---|---|---|
| 3,637,010 A | 1/1972 | Malay et al. | 166/51 |
| 3,741,301 A | 6/1973 | Malay et al. | 166/191 |
| 3,781,783 A | 12/1973 | Tucker | 340/18 |
| 3,790,930 A | 2/1974 | Lamel et al. | 340/18 |
| 3,900,827 A | 8/1975 | Lamel et al. | 340/18 |
| 3,906,434 A | 9/1975 | Lamel et al. | 340/18 |
| 4,001,773 A | 1/1977 | Lamel et al. | 340/18 |
| 4,283,780 A | 8/1981 | Nardi | 367/82 |
| 4,298,970 A | 11/1981 | Shawhan et al. | 367/82 |
| 4,302,826 A | 11/1981 | Kent et al. | 367/82 |
| 4,314,365 A | 2/1982 | Petersen et al. | 367/82 |
| 4,884,071 A | 11/1989 | Howard | 340/854 |
| 4,962,489 A | 10/1990 | Medlin et al. | 367/32 |
| 5,128,901 A | 7/1992 | Drumheller | 367/82 |
| 5,136,613 A | 8/1992 | Dumestre, III | 375/1 |
| 5,166,908 A | 11/1992 | Montgomery | 367/165 |
| 5,182,946 A | 2/1993 | Boughner et al. | 73/151 |
| 5,234,055 A | 8/1993 | Cornette | 166/278 |
| 5,283,768 A | 2/1994 | Rorden | 367/83 |
| 5,373,481 A | 12/1994 | Orban et al. | 367/82 |
| 5,468,025 A | 11/1995 | Adinolfe et al. | 285/114 |
| 5,480,201 A | 1/1996 | Mercer | 294/67.31 |
| 5,495,230 A | 2/1996 | Lian | 340/551 |
| 5,569,240 A | 10/1996 | Campbell | 227/130 |
| 5,592,438 A | 1/1997 | Rorden et al. | 367/83 |
| 5,667,650 A | 9/1997 | Face et al. | 204/298.07 |
| 5,850,369 A | 12/1998 | Rorden et al. | 367/83 |
| 5,857,146 A | 1/1999 | Kido | 455/38.3 |
| 5,924,499 A | 7/1999 | Birchak et al. | 175/40 |
| 5,960,883 A | 10/1999 | Tubel et al. | 166/313 |
| 5,995,449 A | 11/1999 | Green et al. | 367/83 |
| 6,049,508 A | 4/2000 | Deflandre | 367/48 |
| 6,125,080 A | 9/2000 | Sonnenschein et al. | 367/134 |
| 6,128,250 A | 10/2000 | Reid et al. | 367/153 |
| 6,177,882 B1 | 1/2001 | Ringgenberg et al. | 340/853.7 |
| 6,236,850 B1 | 5/2001 | Desai | 455/343 |
| 6,239,690 B1 | 5/2001 | Burbidge et al. | 340/10.33 |
| 6,300,743 B1 | 10/2001 | Patino et al. | 320/106 |
| 6,320,820 B1 | 11/2001 | Gardner et al. | 367/81 |
| 6,324,904 B1 | 12/2001 | Ishikawa et al. | 73/152.03 |
| 6,360,769 B1 | 3/2002 | Brisco | 137/268 |
| 6,394,184 B2 | 5/2002 | Tolman et al. | 166/281 |
| 6,400,646 B1 | 6/2002 | Shah et al. | 367/82 |
| 6,429,784 B1 | 8/2002 | Beique et al. | 340/853.2 |
| 6,462,672 B1 | 10/2002 | Besson | 340/853.2 |
| 6,543,538 B2 | 4/2003 | Tolman et al. | 166/284 |
| 6,670,880 B1 | 12/2003 | Hall et al. | 336/132 |
| 6,679,332 B2 | 1/2004 | Vinegar et al. | 166/373 |
| 6,695,277 B1 | 2/2004 | Gallis | 241/191 |
| 6,702,019 B2 | 3/2004 | Dusterhoft et al. | 166/278 |
| 6,717,501 B2 | 4/2004 | Hall et al. | 336/132 |
| 6,727,827 B1 | 4/2004 | Edwards et al. | 340/854.9 |
| 6,745,012 B1* | 6/2004 | Ton | H04L 1/0006 455/67.13 |
| 6,772,837 B2 | 8/2004 | Dusterhoft et al. | 166/278 |
| 6,816,082 B1 | 11/2004 | Laborde | 340/853.3 |
| 6,868,037 B2 | 3/2005 | Dasgupta et al. | 367/54 |
| 6,880,634 B2 | 4/2005 | Gardner et al. | 166/250.01 |
| 6,883,608 B2 | 4/2005 | Parlar et al. | 166/278 |
| 6,899,178 B2 | 5/2005 | Tubel | 166/313 |
| 6,909,667 B2 | 6/2005 | Shah et al. | 367/83 |
| 6,912,177 B2 | 6/2005 | Smith | 367/82 |
| 6,920,085 B2 | 7/2005 | Finke et al. | 367/83 |
| 6,930,616 B2 | 8/2005 | Tang et al. | 340/854.4 |
| 6,940,392 B2 | 9/2005 | Chan et al. | 340/10.4 |
| 6,940,420 B2 | 9/2005 | Jenkins | 340/855.6 |
| 6,953,094 B2 | 10/2005 | Ross et al. | 166/381 |
| 6,956,791 B2 | 10/2005 | Dopf et al. | 367/82 |
| 6,980,929 B2 | 12/2005 | Aronstam et al. | 702/188 |
| 6,987,463 B2 | 1/2006 | Beique et al. | 340/856.3 |
| 7,006,918 B2 | 2/2006 | Economides et al. | 702/1 |
| 7,011,157 B2 | 3/2006 | Costley et al. | 166/311 |
| 7,036,601 B2 | 5/2006 | Berg et al. | 166/385 |
| 7,051,812 B2 | 5/2006 | McKee et al. | 166/305.1 |
| 7,064,676 B2 | 6/2006 | Hall et al. | 350/853.1 |
| 7,082,993 B2 | 8/2006 | Ayoub et al. | 166/250.1 |
| 7,090,020 B2 | 8/2006 | Hill et al. | 166/373 |
| 7,140,434 B2 | 11/2006 | Chouzenoux et al. | 166/250.11 |
| 7,219,762 B2 | 5/2007 | James et al. | 181/105 |
| 7,224,288 B2 | 5/2007 | Hall et al. | 340/853.7 |
| 7,228,902 B2 | 6/2007 | Oppelt | 166/250.02 |
| 7,249,636 B2 | 7/2007 | Ohmer | 166/383 |
| 7,252,152 B2 | 8/2007 | LoGiudice et al. | 166/386 |
| 7,257,050 B2 | 8/2007 | Stewart et al. | 367/82 |
| 7,261,154 B2 | 8/2007 | Hall et al. | 166/242.2 |
| 7,261,162 B2 | 8/2007 | Deans et al. | 166/336 |
| 7,275,597 B2 | 10/2007 | Hall et al. | 166/297 |
| 7,277,026 B2 | 10/2007 | Hall et al. | 340/854.8 |
| RE40,032 E | 1/2008 | van Bokhorst et al. | 455/343.2 |
| 7,317,990 B2 | 1/2008 | Sinha et al. | 702/6 |
| 7,321,788 B2 | 1/2008 | Addy et al. | 455/574 |
| 7,322,416 B2 | 1/2008 | Burris, II et al. | 166/308.1 |
| 7,325,605 B2 | 2/2008 | Fripp et al. | 166/250.01 |
| 7,339,494 B2 | 3/2008 | Shah et al. | 340/855.7 |
| 7,348,893 B2 | 3/2008 | Huang et al. | 340/854.3 |
| 7,385,523 B2 | 6/2008 | Thomeer et al. | 340/854.8 |
| 7,387,165 B2 | 6/2008 | Lopez de Cardenas et al. | 166/313 |
| 7,411,517 B2 | 8/2008 | Flanagan | 340/854.4 |
| 7,477,160 B2 | 1/2009 | Lemenager et al. | 340/853.1 |
| 7,516,792 B2 | 4/2009 | Lonnes et al. | 166/308.1 |
| 7,551,057 B2 | 6/2009 | King et al. | 340/5.72 |
| 7,590,029 B2 | 9/2009 | Tingley | 367/82 |
| 7,595,737 B2 | 9/2009 | Fink et al. | 340/854.4 |
| 7,602,668 B2 | 10/2009 | Liang et al. | 367/25 |
| 7,649,473 B2 | 1/2010 | Johnson et al. | 340/853.1 |
| 7,750,808 B2 | 7/2010 | Masino et al. | 340/572.1 |
| 7,775,279 B2 | 8/2010 | Marya et al. | 166/297 |
| 7,787,327 B2 | 8/2010 | Tang et al. | 367/27 |
| 7,819,188 B2 | 10/2010 | Auzerais et al. | 155/250 |
| 7,828,079 B2 | 11/2010 | Oothoudt | 175/20 |
| 7,831,283 B2 | 11/2010 | Ogushi et al. | 455/574 |
| 7,913,773 B2 | 3/2011 | Li et al. | 175/40 |
| 7,952,487 B2 | 5/2011 | Montebovi | 340/636.1 |
| 7,994,932 B2 | 8/2011 | Huang et al. | 340/854.3 |
| 8,004,421 B2 | 8/2011 | Clark | 340/854.4 |
| 8,044,821 B2 | 10/2011 | Mehta | 340/855.7 |
| 8,049,506 B2 | 11/2011 | Lazarev | 324/333 |
| 8,115,651 B2 | 2/2012 | Camwell et al. | 340/853.2 |
| 8,117,907 B2 | 2/2012 | Han et al. | 73/152.58 |
| 8,157,008 B2 | 4/2012 | Lilley | 166/253.1 |
| 8,162,050 B2 | 4/2012 | Roddy et al. | 166/253.1 |
| 8,220,542 B2 | 7/2012 | Whitsitt et al. | 166/278 |
| 8,237,585 B2 | 8/2012 | Zimmerman | 340/854.6 |
| 8,242,928 B2 | 8/2012 | Prammer | 340/853.7 |
| 8,276,674 B2 | 10/2012 | Lopez de Cardenas et al. | 166/373 |
| 8,284,075 B2 | 10/2012 | Fincher et al. | 340/854.4 |
| 8,284,947 B2 | 10/2012 | Giesbrecht et al. | 381/66 |
| 8,316,936 B2 | 11/2012 | Roddy et al. | 166/253.1 |
| 8,330,617 B2 | 12/2012 | Chen et al. | 340/854.6 |
| 8,347,982 B2 | 1/2013 | Hannegan et al. | 175/5 |
| 8,358,220 B2 | 1/2013 | Savage | 340/853.1 |
| 8,376,065 B2 | 2/2013 | Teodorescu et al. | 175/40 |
| 8,381,822 B2 | 2/2013 | Hales et al. | 166/377 |
| 8,388,899 B2 | 3/2013 | Mitani et al. | 422/179 |
| 8,411,530 B2 | 4/2013 | Slocum et al. | 367/90 |
| 8,434,354 B2 | 5/2013 | Crow et al. | 73/152.04 |
| 8,494,070 B2 | 7/2013 | Luo et al. | 375/262 |
| 8,496,055 B2 | 7/2013 | Mootoo et al. | 166/278 |
| 8,539,890 B2 | 9/2013 | Tripp et al. | 109/25 |
| 8,544,564 B2 | 10/2013 | Moore et al. | 175/50 |
| 8,552,597 B2 | 10/2013 | Song et al. | 307/149 |
| 8,556,302 B2 | 10/2013 | Dole | 285/367 |
| 8,559,272 B2 | 10/2013 | Wang | |
| 8,596,359 B2 | 12/2013 | Grigsby et al. | 166/278 |
| 8,605,548 B2 | 12/2013 | Froelich | 367/82 |
| 8,607,864 B2 | 12/2013 | Mcleod et al. | 166/250.1 |
| 8,664,958 B2 | 3/2014 | Simon | 324/338 |

(56) References Cited

U.S. PATENT DOCUMENTS

| | | | | |
|---|---|---|---|---|
| 8,672,875 | B2 | 3/2014 | Vanderveen et al. | 604/67 |
| 8,675,779 | B2 | 3/2014 | Zeppetelle et al. | 375/340 |
| 8,683,859 | B2 | 4/2014 | Godager | 73/152.54 |
| 8,689,621 | B2 | 4/2014 | Godager | 73/152.54 |
| 8,701,480 | B2 | 4/2014 | Eriksen | 73/152.51 |
| 8,750,789 | B2 | 6/2014 | Baldemair et al. | 455/11.1 |
| 8,787,840 | B2 | 7/2014 | Srinivasan et al. | 455/69 |
| 8,805,632 | B2 | 8/2014 | Coman et al. | 702/89 |
| 8,826,980 | B2 | 9/2014 | Neer | 166/255.1 |
| 8,833,469 | B2 | 9/2014 | Purkis | 166/373 |
| 8,893,784 | B2 | 11/2014 | Abad | E21B 43/26 |
| 8,910,716 | B2 | 12/2014 | Newton et al. | 166/373 |
| 8,994,550 | B2 | 3/2015 | Millot et al. | E21B 47/16 |
| 8,995,837 | B2 | 3/2015 | Mizuguchi et al. | H04B 10/27 |
| 9,062,508 | B2 | 6/2015 | Huval et al. | E21B 47/122 |
| 9,062,531 | B2 | 6/2015 | Jones | E21B 47/082 |
| 9,075,155 | B2 | 7/2015 | Luscombe et al. | G01V 1/226 |
| 9,078,055 | B2 | 7/2015 | Nguyen et al. | H04R 5/00 |
| 9,091,153 | B2 | 7/2015 | Yang et al. | E21B 47/12 |
| 9,133,705 | B2 | 9/2015 | Angeles Boza | E21B 47/12 |
| 9,140,097 | B2 | 9/2015 | Themig et al. | E21B 34/12 |
| 9,144,894 | B2 | 9/2015 | Barnett et al. | B25B 17/00 |
| 9,206,645 | B2 | 12/2015 | Hallundbaek | E21B 7/04 |
| 9,279,301 | B2 | 3/2016 | Lovorn et al. | E21B 21/103 |
| 9,284,819 | B2 | 3/2016 | Tolman et al. | E21B 41/00 |
| 9,284,834 | B2 | 3/2016 | Alteirac et al. | E21B 47/12 |
| 9,310,510 | B2 | 4/2016 | Godager | G01V 3/38 |
| 9,333,350 | B2 | 5/2016 | Rise et al. | A61N 1/36082 |
| 9,334,696 | B2 | 5/2016 | Hay | E21B 47/12 |
| 9,359,841 | B2 | 6/2016 | Hall | E21B 23/00 |
| 9,363,605 | B2 | 6/2016 | Goodman et al. | H04R 17/00 |
| 9,376,908 | B2 | 6/2016 | Ludwig et al. | E21B 47/01 |
| 9,441,470 | B2 | 9/2016 | Guerrero et al. | E21B 43/14 |
| 9,515,748 | B2 | 12/2016 | Jeong et al. | G10L 25/90 |
| 9,557,434 | B2 | 1/2017 | Keller et al. | G01V 1/52 |
| 9,617,829 | B2 | 4/2017 | Dale et al. | E21B 41/00 |
| 9,617,850 | B2 | 4/2017 | Fripp et al. | E21B 47/18 |
| 9,631,485 | B2 | 4/2017 | Keller et al. | E21B 47/16 |
| 9,657,564 | B2 | 5/2017 | Stolpman | E21B 47/16 |
| 9,664,037 | B2 | 5/2017 | Logan et al. | E21B 47/122 |
| 9,670,773 | B2 | 6/2017 | Croux | E21B 47/16 |
| 9,683,434 | B2 | 6/2017 | Machocki | E21B 44/00 |
| 9,686,021 | B2 | 6/2017 | Merino | E21B 47/16 |
| 9,715,031 | B2 | 7/2017 | Contant et al. | E21B 47/122 |
| 9,721,448 | B2 | 8/2017 | Wu et al. | G08B 21/20 |
| 9,759,062 | B2 | 9/2017 | Deffenbaugh et al. | E21B 47/16 |
| 9,816,373 | B2 | 11/2017 | Howell et al. | E21B 47/16 |
| 9,822,634 | B2 | 11/2017 | Gao | E21B 47/16 |
| 9,863,222 | B2 | 1/2018 | Morrow et al. | E21B 43/12 |
| 9,879,525 | B2 | 1/2018 | Morrow et al. | E21B 47/12 |
| 9,945,204 | B2 | 4/2018 | Ross et al. | E21B 33/127 |
| 9,963,955 | B2 | 5/2018 | Tolman et al. | E21B 43/119 |
| 10,100,635 | B2 | 10/2018 | Keller et al. | E21B 47/18 |
| 10,103,846 | B2 | 10/2018 | van Zelm et al. | E21B 47/12 |
| 10,132,149 | B2 | 11/2018 | Morrow et al. | E21B 43/267 |
| 10,145,228 | B2 | 12/2018 | Yarus et al. | E21B 44/00 |
| 10,167,716 | B2 | 1/2019 | Clawson et al. | E21B 47/14 |
| 10,167,717 | B2 | 1/2019 | Deffenbaugh et al. | E21B 47/16 |
| 10,190,410 | B2 | 1/2019 | Clawson et al. | E21B 47/14 |
| 10,196,862 | B2 | 2/2019 | Li-Leger et al. | E21B 17/02 |
| 2002/0180613 | A1 | 12/2002 | Shi et al. | E21B 47/18 |
| 2002/0196743 | A1 | 12/2002 | Thalanany et al. | |
| 2003/0056953 | A1 | 3/2003 | Tumlin et al. | 166/298 |
| 2003/0067940 | A1 | 4/2003 | Edholm | |
| 2003/0117896 | A1 | 6/2003 | Sakuma et al. | 367/81 |
| 2004/0020063 | A1 | 2/2004 | Lewis et al. | 33/313 |
| 2004/0200613 | A1 | 10/2004 | Fripp et al. | 166/250.01 |
| 2004/0239521 | A1 | 12/2004 | Zierolf | 340/854.1 |
| 2004/0262008 | A1* | 12/2004 | Deans | E21B 41/0007 166/339 |
| 2005/0269083 | A1 | 12/2005 | Burris, II et al. | 166/255.2 |
| 2005/0284659 | A1 | 12/2005 | Hall et al. | 175/27 |
| 2006/0033638 | A1 | 2/2006 | Hall et al. | 340/854.6 |
| 2006/0041795 | A1 | 2/2006 | Gabelmann et al. | 714/699 |
| 2006/0090893 | A1 | 5/2006 | Sheffield | 166/250.15 |
| 2006/0187755 | A1 | 8/2006 | Tingley | |
| 2007/0139217 | A1 | 6/2007 | Beique et al. | 340/856.3 |
| 2007/0146351 | A1 | 6/2007 | Katsuhira et al. | 345/179 |
| 2007/0156359 | A1 | 7/2007 | Varsamis et al. | 702/69 |
| 2007/0219758 | A1 | 9/2007 | Bloomfield | 702/190 |
| 2007/0272411 | A1 | 11/2007 | Lopez de Cardenas et al. | 166/305.1 |
| 2008/0030365 | A1 | 2/2008 | Fripp et al. | E21B 47/16 |
| 2008/0105426 | A1* | 5/2008 | Di | G01V 1/40 166/250.02 |
| 2008/0110644 | A1 | 5/2008 | Howell et al. | 166/387 |
| 2008/0185144 | A1 | 8/2008 | Lovell | 166/250.17 |
| 2008/0304360 | A1 | 12/2008 | Mozer | 367/117 |
| 2009/0003133 | A1 | 1/2009 | Dalton et al. | 367/82 |
| 2009/0030614 | A1 | 1/2009 | Carnegie et al. | 702/6 |
| 2009/0034368 | A1 | 2/2009 | Johnson | 367/83 |
| 2009/0045974 | A1 | 2/2009 | Patel | 340/854.6 |
| 2009/0080291 | A1 | 3/2009 | Tubel et al. | 367/81 |
| 2009/0166031 | A1 | 7/2009 | Hernandez | 166/250.01 |
| 2010/0013663 | A1 | 1/2010 | Cavender et al. | 340/854.3 |
| 2010/0089141 | A1 | 4/2010 | Rioufol et al. | 73/152.28 |
| 2010/0133004 | A1 | 6/2010 | Burleson et al. | 175/2 |
| 2010/0182161 | A1 | 7/2010 | Robbins et al. | 340/853.7 |
| 2010/0212891 | A1 | 8/2010 | Stewart et al. | 166/250.12 |
| 2011/0061862 | A1 | 3/2011 | Loretz et al. | 166/250.11 |
| 2011/0066378 | A1 | 3/2011 | Lerche et al. | 702/6 |
| 2011/0098931 | A1* | 4/2011 | Kosmala | E21B 47/00 702/12 |
| 2011/0139441 | A1* | 6/2011 | Zolezzi Garreton | E21B 43/003 166/249 |
| 2011/0168403 | A1 | 7/2011 | Patel | 166/373 |
| 2011/0188345 | A1 | 8/2011 | Wang | 367/34 |
| 2011/0297376 | A1 | 12/2011 | Holderman et al. | 166/278 |
| 2011/0297673 | A1 | 12/2011 | Zbat et al. | 219/756 |
| 2011/0301439 | A1 | 12/2011 | Albert et al. | 600/301 |
| 2011/0315377 | A1 | 12/2011 | Rioufol | 166/250.17 |
| 2012/0043079 | A1 | 2/2012 | Wassouf et al. | 166/250 |
| 2012/0126992 | A1 | 5/2012 | Rodney et al. | 340/850 |
| 2012/0152562 | A1 | 6/2012 | Newton et al. | 166/369 |
| 2012/0179377 | A1 | 7/2012 | Lie | 702/6 |
| 2013/0000981 | A1 | 1/2013 | Grimmer et al. | 175/45 |
| 2013/0003503 | A1 | 1/2013 | L'Her et al. | 367/106 |
| 2013/0106615 | A1 | 5/2013 | Prammer | 340/854.6 |
| 2013/0138254 | A1 | 5/2013 | Seals et al. | 700/282 |
| 2013/0192823 | A1 | 8/2013 | Barrilleaux et al. | 166/250.01 |
| 2013/0278432 | A1 | 10/2013 | Shashoua et al. | 340/853.7 |
| 2013/0319102 | A1 | 12/2013 | Riggenberg et al. | 73/152.28 |
| 2014/0060840 | A1 | 3/2014 | Hartshorne et al. | 166/300 |
| 2014/0062715 | A1 | 3/2014 | Clark | 340/853.2 |
| 2014/0102708 | A1 | 4/2014 | Purkis et al. | 166/308.1 |
| 2014/0133276 | A1 | 5/2014 | Volker et al. | 367/82 |
| 2014/0152659 | A1 | 6/2014 | Davidson et al. | 345/420 |
| 2014/0153368 | A1 | 6/2014 | Bar-Cohen et al. | 367/81 |
| 2014/0166266 | A1 | 6/2014 | Read | 166/250.01 |
| 2014/0170025 | A1 | 6/2014 | Weiner et al. | 422/82.01 |
| 2014/0266769 | A1* | 9/2014 | van Zelm | E21B 47/12 340/854.3 |
| 2014/0327552 | A1 | 11/2014 | Filas et al. | 340/854.6 |
| 2014/0352955 | A1 | 12/2014 | Tubel et al. | 166/250.15 |
| 2015/0003202 | A1 | 1/2015 | Palmer et al. | 367/82 |
| 2015/0009040 | A1 | 1/2015 | Bowles et al. | 340/854.6 |
| 2015/0027687 | A1 | 1/2015 | Tubel | 166/72 |
| 2015/0041124 | A1 | 2/2015 | Rodriguez | 166/255.1 |
| 2015/0041137 | A1 | 2/2015 | Rodriguez | 166/301 |
| 2015/0152727 | A1 | 6/2015 | Fripp et al. | E21B 47/14 |
| 2015/0159481 | A1 | 6/2015 | Mebarkia et al. | E21B 47/065 |
| 2015/0167425 | A1 | 6/2015 | Hammer et al. | E21B 34/06 |
| 2015/0176370 | A1 | 6/2015 | Greening et al. | E21B 41/00 |
| 2015/0292319 | A1 | 10/2015 | Disko et al. | E21B 47/16 |
| 2015/0292320 | A1 | 10/2015 | Lynk et al. | E21B 47/16 |
| 2015/0300159 | A1 | 10/2015 | Stiles et al. | E21B 47/16 |
| 2015/0330200 | A1 | 11/2015 | Richard et al. | E21B 44/00 |
| 2015/0337642 | A1 | 11/2015 | Spacek | E21B 44/005 |
| 2015/0354351 | A1 | 12/2015 | Morrow et al. | E21B 47/16 |
| 2015/0377016 | A1 | 12/2015 | Ahmad | E21B 47/122 |
| 2016/0010446 | A1 | 1/2016 | Logan et al. | E21B 47/122 |

(56) References Cited

U.S. PATENT DOCUMENTS

| | | | |
|---|---|---|---|
| 2016/0047230 A1 | 2/2016 | Livescu et al. | E21B 47/10 |
| 2016/0047233 A1 | 2/2016 | Butner et al. | E21B 47/12 |
| 2016/0047238 A1* | 2/2016 | Zeroug | E21B 47/0005 367/86 |
| 2016/0076363 A1 | 3/2016 | Morrow et al. | E21B 47/12 |
| 2016/0109606 A1 | 4/2016 | Market et al. | G01V 1/50 |
| 2016/0215612 A1 | 7/2016 | Morrow | E21B 47/122 |
| 2017/0138185 A1 | 5/2017 | Saed et al. | E21B 47/16 |
| 2017/0145811 A1 | 5/2017 | Robison et al. | E21B 47/0007 |
| 2017/0152741 A1 | 6/2017 | Park et al. | E21B 47/123 |
| 2017/0167249 A1* | 6/2017 | Lee | E21B 47/123 |
| 2017/0204719 A1 | 7/2017 | Babakhani | E21B 47/0005 |
| 2017/0254183 A1 | 9/2017 | Vasques et al. | E21B 47/16 |
| 2017/0293044 A1 | 10/2017 | Gilstrap et al. | G01V 1/50 |
| 2017/0314386 A1 | 11/2017 | Orban et al. | E21B 47/091 |
| 2018/0010449 A1 | 1/2018 | Roberson et al. | E21B 47/16 |
| 2018/0058191 A1 | 3/2018 | Romer et al. | E21B 47/0007 |
| 2018/0058198 A1 | 3/2018 | Ertas et al. | E21B 47/12 |
| 2018/0058202 A1 | 3/2018 | Disko et al. | E21B 47/14 |
| 2018/0058203 A1 | 3/2018 | Clawson et al. | E21B 47/14 |
| 2018/0058204 A1 | 3/2018 | Clawson et al. | E21B 47/14 |
| 2018/0058205 A1 | 3/2018 | Clawson et al. | E21B 47/14 |
| 2018/0058206 A1 | 3/2018 | Zhang et al. | E21B 47/16 |
| 2018/0058207 A1 | 3/2018 | Song et al. | E21B 47/16 |
| 2018/0058208 A1 | 3/2018 | Song et al. | E21B 47/16 |
| 2018/0058209 A1 | 3/2018 | Song et al. | E21B 47/16 |
| 2018/0066490 A1 | 3/2018 | Kjos | E21B 33/035 |
| 2018/0066510 A1 | 3/2018 | Walker et al. | E21B 47/011 |
| 2018/0223652 A1* | 8/2018 | Roberson | E21B 47/122 |

FOREIGN PATENT DOCUMENTS

| | | | |
|---|---|---|---|
| EP | 1409839 | 4/2005 | E21B 43/1185 |
| EP | 2677698 | 12/2013 | H01L 12/28 |
| WO | WO 01/03391 A1 | 1/2001 | |
| WO | WO2002/027139 | 4/2002 | E21B 43/12 |
| WO | WO 2004/033852 A1 | 4/2004 | |
| WO | WO2010/074766 | 7/2010 | A41C 1/14 |
| WO | WO2013/079928 | 6/2013 | E21B 47/12 |
| WO | WO 2013/162506 A1 | 10/2013 | |
| WO | WO2014/018010 | 1/2014 | E21B 47/12 |
| WO | WO2014/049360 | 4/2014 | E21B 47/12 |
| WO | WO2014/100271 | 6/2014 | E21B 47/12 |
| WO | WO2014/134741 | 9/2014 | E21B 47/13 |
| WO | WO2015/117060 | 8/2015 | E21B 47/12 |

OTHER PUBLICATIONS

U.S. Appl. No. 16/139,373, filed Sep. 24, 2018, Yi, Xiaohua et al.
U.S. Appl. No. 16/139,384, filed Oct. 13, 2017, Disko, Mark M. et al.
U.S. Appl. No. 16/139,394, filed Oct. 13, 2017, Song, Limin et al.
U.S. Appl. No. 16/139,403, filed Oct. 13, 2017, Song, Limin et al.
U.S. Appl. No. 16/139,414, filed Oct. 13, 2017, Zhang, Yibing et al.
U.S. Appl. No. 16/139,421, filed Oct. 13, 2017, Song, Limin et al.
U.S. Appl. No. 16/139,427, filed Oct. 13, 2017, Disko, Mark M. et al.
U.S. Appl. No. 16/175,418, filed Oct. 30, 2018, Kent, David K. et al.
U.S. Appl. No. 62/588,067, filed Nov. 17, 2017, Song, Limin et al.
U.S. Appl. No. 62/588,080, filed Nov. 17, 2017, Kinn, Timothy F. et al.
U.S. Appl. No. 62/588,103, filed Nov. 17, 2017, Yi, Xiaohua et al.
Arroyo, Javier et al. (2009) "Forecasting Histogram Time Series with K-Nearest Neighbours Methods," *International Journal of Forecasting*, v.25, pp. 192-207.
Arroyo, Javier et al. (2011) "Smoothing Methods for Histogram-Valued Time Seriers: An Application to Value-at-Risk," *Univ. of California, Dept. of Economics*, www.wileyonlinelibrary.com, Mar. 8, 2011, 28 pages.
Arroyo, Javier et al. (2011) "Forecasting with Interval and Histogram Data Some Financial Applications," *Univ. of California, Dept. of Economics*, 46 pages.
Emerson Process Management (2011), "Roxar downhole Wireless PT sensor system," www.roxar.com, or downhole@roxar.com, 2 pgs.
Gonzalez-Rivera, Gloria et al. (2012) "Time Series Modeling of Histogram-Valued Data: The Daily Histogram Time Series of S&P500 Intradaily Returns," *International Journal of Forecasting*, v.28, 36 pgs.
Gutierrez-Estevez, M. A. et al. (2013) "Acoustic Boardband Communications Over Deep Drill Strings using Adaptive OFDM", *IEEE Wireless Comm. & Networking Conf.*, pp. 4089-4094.
Qu, X. et al. (2011) "Reconstruction fo Self-Sparse 20 NMR Spectra From undersampled Data In The Indirect Dimension", pp. 8888-8909.
U.S. Department of Defense (1999) "Interoperability and Performance Standards for Medium and High Frequency Radio Systems," *MIL-STD-188-141B*, Mar. 1, 1999, 584 pages.

\* cited by examiner

METHOD AND SYSTEM FOR PERFORMING HYDROCARBON OPERATIONS WITH MIXED COMMUNICATION NETWORKS

CROSS REFERENCE TO RELATED APPLICATION

This application claims the priority benefit of U.S. Provisional Application No. 62/572,211, filed Oct. 13, 2017 entitled "Method and System for Performing Hydrocarbon Operations with Mixed Communication Networks," the entirety of which is incorporated herein.

This application is related to the following U.S. patents and patent applications, the disclosures of which are incorporated herein by reference in their entireties: U.S. Pat. No. 10,415,376 titled "Dual Transducer Communications Node For Downhole Acoustic Wireless Networks and Method Employing Same," U.S. patent application Ser. No. 15/665,931, filed Aug. 1, 2017, titled "Communication Networks, Relay Nodes for Communication Networks, and Methods of Transmitting Data Among a Plurality of Relay Nodes," U.S. Pat. No. 10,487,647 titled "Hybrid Downhole Acoustic Wireless Network," U.S. Pat. No. 10,167,716 titled "Methods of Acoustically Communicating And Wells That Utilize The Methods," U.S. Pat. No. 10,364,669 titled "Methods of Acoustically Communicating And Wells That Utilize The Methods," U.S. Pat. No. 10,190,410 titled "Methods of Acoustically Communicating and Wells that Utilize the Methods," U.S. Pat. No. 10,526,888 titled "Downhole Multiphase Flow Sensing Methods," U.S. Pat.No. 10,344,583 titled "Acoustic Housing for Tubulars".

This application is related to the following U.S. Patent Applications having common inventors and assignee and filed on an even date herewith, the disclosures of which are incorporated by reference herein in their entireties: U.S. application Ser. No. 16/139,414 titled "Method and System For Performing Operations Using Communications"; U.S. application Ser. No. 16/139,394, titled "Method And System For Performing Communications Using Aliasing"; U.S. application No. 16/139,427, titled "Method and System For Performing Operations With Communications"; U.S. application Ser. No. 16/139,421, titled "Method And System For Performing Wireless Communications Along A Drilling String"; and U.S. application Ser. No. 16/139,403 titled "Dual Transducer Communications Node Including Piezo Pre-Tensioning for Acoustic Wireless Networks and Method Employing Same".

FIELD OF THE INVENTION

This disclosure relates generally to the field of hydrocarbon exploration, hydrocarbon development, and hydrocarbon production and, more particularly, to communicate along one or more tubular members. Specifically, the disclosure relates to methods and systems for acoustically, electrically and/or optically communicating between communication nodes disposed along one or more tubular members, such as along casing or tubing within a wellbore, along a subsea conduit and/or along a pipeline, to obtain wellbore measurements and to enhance operations, which may include hydrocarbon operations, such as hydrocarbon exploration, hydrocarbon development, and/or hydrocarbon production.

BACKGROUND

This section is intended to introduce various aspects of the art, which may be associated with exemplary embodiments of the present disclosure. This discussion is believed to assist in providing a framework to facilitate a better understanding of particular aspects of the present invention. Accordingly, it should be understood that this section should be read in this light, and not necessarily as admissions of prior art.

The exchange of information may be used to manage the operations. By way of example, several real-time data systems or methods have been proposed in hydrocarbon exploration, hydrocarbon development, and/or hydrocarbon production operations. To exchange information, the devices may communicate with physical connections or wireless connections. As a first example, a physical or hard-wired connection, such as a cable, an electrical conductor or a fiber optic cable, is secured to a tubular member, which may be used to evaluate subsurface conditions. The cable may be secured to an inner portion of the tubular member, such as a conduit, or an outer portion of the tubular member. The cable provides a hard wire connection to provide real-time transmission of data. Further, the cables may be used to provide high data transmission rates and the delivery of electrical power directly to downhole sensors. However, use of physical cables may be difficult as the cables have to be unspooled and attached to the tubular member sections disposed within a wellbore. Accordingly, the tubular members being installed into the well may not be rotated because of the attached cables, which may be broken through such installations. This limitation may be problematic for installations into horizontal wells, which typically involve rotating the tubular members. Further, the cables have to be attached and passages have to be provided to pass the cables through the wellbore, the well head and other equipment (e.g., openings for the cables). These passages for the cables provide potential locations for leakage of fluids, which may be more problematic for configurations that involve high pressures fluids. In addition, the leakage of down-hole fluids may increase the risk of cement seal failures.

In contrast to the physical connection configuration, various wireless technologies may be used for downhole communications and reporting sensing measurements or the state of various subsurface tools or structures. Such technologies are referred to as wireless telemetry. The use of radio transmission may also be impractical or unavailable in certain environments or during certain operations. Acoustic telemetry utilizes an acoustic wireless network to wirelessly transmit an acoustic signal, such as a vibration, via a tone transmission medium. In general, a given tone transmission medium may only permit communication within a certain frequency range; and, in some systems, this frequency range may be relatively small. Such systems may be referred to herein as spectrum-constrained systems. An example of a spectrum-constrained system is a well, such as a hydrocarbon well, that includes a plurality of communication nodes spaced-apart along a length thereof.

Under certain circumstances, it may be desirable to transmit data, in the form of acoustic signals, within such a spectrum-constrained environment. However, conventional data transmission mechanisms often cannot be effectively utilized. For example, the methods of acoustically communicating may utilize an acoustic wireless network including various communication nodes spaced-apart along a length of a tone transmission medium. These communication nodes may exchange signals with each other to manage the exchange of data within the wellbore and with a computer system that is utilized to manage the hydrocarbon operations.

Accordingly, there remains a need in the industry for methods and systems that are more efficient and may lessen problems associated with noisy and ineffective communication. Further, a need remains for efficient approaches to perform acoustic communications along tubular members. The present techniques provide methods and systems that overcome one or more of the deficiencies discussed above.

SUMMARY

In one embodiment, a method for communicating data among a plurality of communication nodes, which may be disposed along a wave propagation channel, a tone transmission medium, acoustic channel, a communication medium, and/or along one or more tubular members, is described. The method comprising: providing a communication network that comprises a first type of communication network and a second type of communication network; disposing a first plurality of communication nodes along one or more tubular members to form the first type of communication network; disposing a second plurality of communication nodes along the one or more tubular members to form the second type of communication network; obtaining measurements within the along the one or more tubular members; communicating the obtained measurements via signals over the first type of communication network and the second type of communication network to a control unit; and performing operations, which may include hydrocarbon operations, with the obtained measurements.

In another embodiment, a communication system for communicating data along one or more tubular members is described. The system may comprise: a first plurality of communication nodes disposed along the one or more tubular members to form a first type of communication network; a second plurality of communication nodes disposed along the one or more tubular members to form a second type of communication network, wherein the second type of communication network operates at a different frequency range from the first type of communication network; and a control unit configured to exchange data with the communication network.

BRIEF DESCRIPTION OF THE DRAWINGS

The advantages of the present invention are better understood by referring to the following detailed description and the attached drawings.

DETAILED DESCRIPTION

Figure 1:
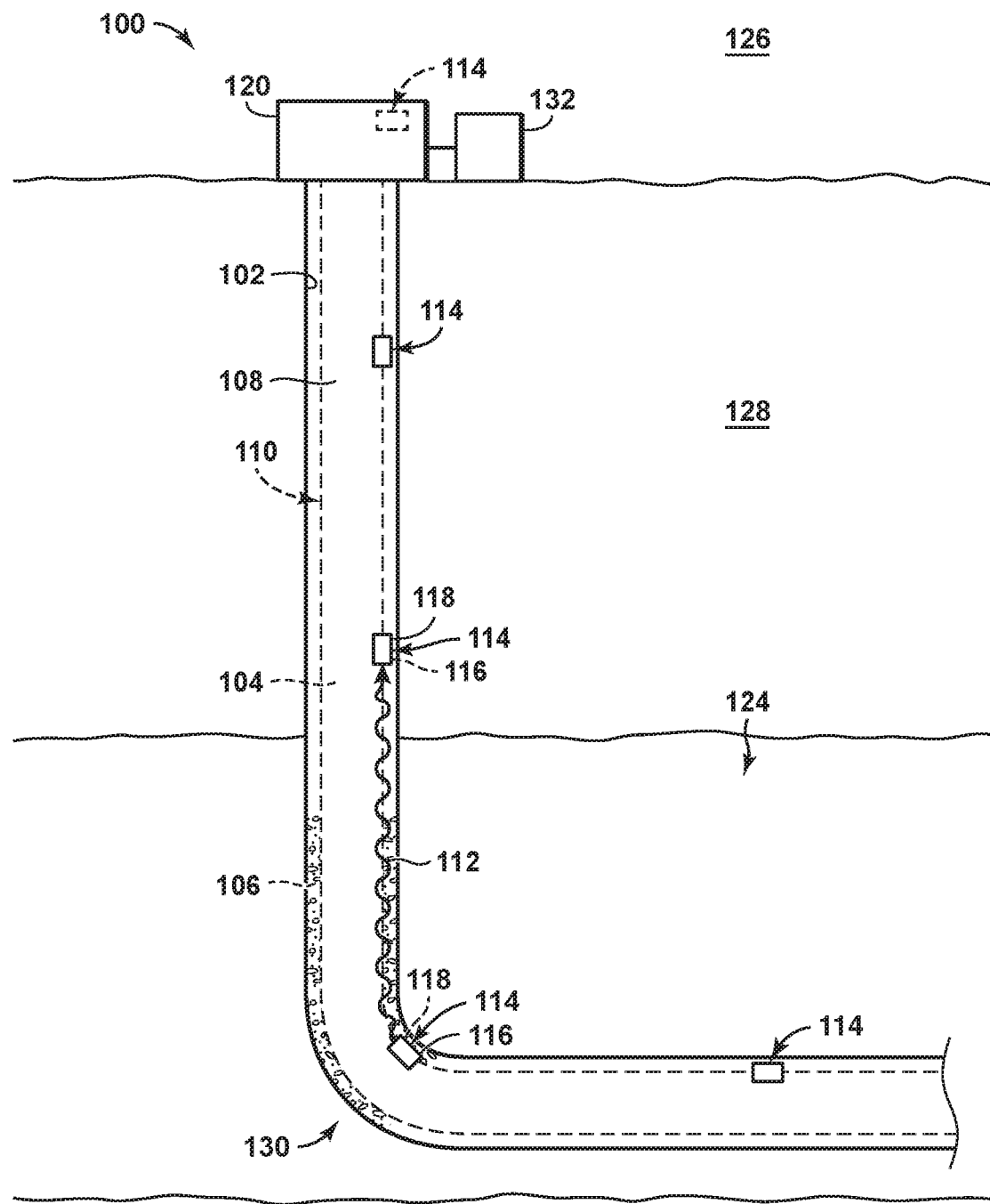
FIG. 1 is a schematic representation of a well configured to utilize the methods according to the present disclosure.

In the following detailed description section, the specific embodiments of the present disclosure are described in connection with preferred embodiments. However, to the extent that the following description is specific to a particular embodiment or a particular use of the present disclosure, this is intended to be for exemplary purposes only and simply provides a description of the exemplary embodiments. Accordingly, the disclosure is not limited to the specific embodiments described below, but rather, it includes all alternatives, modifications, and equivalents falling within the true spirit and scope of the appended claims.

Various terms as used herein are defined below. To the extent a term used in a claim is not defined below, it should be given the broadest definition persons in the pertinent art have given that term as reflected in at least one printed publication or issued patent.

The articles "the", "a", and "an" are not necessarily limited to mean only one, but rather are inclusive and open ended so as to include, optionally, multiple such elements.

The directional terms, such as "above", "below", "upper", "lower", etc., are used for convenience in referring to the accompanying drawings. In general, "above", "upper", "upward" and similar terms refer to a direction toward the earth's surface along a wellbore, and "below", "lower", "downward" and similar terms refer to a direction away from the earth's surface along the wellbore. Continuing with the example of relative directions in a wellbore, "upper" and "lower" may also refer to relative positions along the longitudinal dimension of a wellbore rather than relative to the surface, such as in describing both vertical and horizontal wells.

As used herein, the term "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements). As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of".

As used herein, the term "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussion below regarding ranges and numerical data.

As used herein, the term "any" means one, some, or all indiscriminately of whatever quantity.

As used herein, the term "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements). The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

As used herein, the term "based on" does not mean "based only on", unless expressly specified otherwise. In other words, the phrase "based on" describes both "based only on," "based at least on," and "based at least in part on."

As used herein, the term "conduit" refers to a tubular member forming a physical channel through which something is conveyed. The conduit may include one or more of a pipe, a manifold, a tube or the like, or the liquid contained in the tubular member. Alternately, conduit refers to an acoustic channel of liquid which may, for example, exist between the formation and a tubular.

As used herein, the term "couple" refers to an interaction between elements and is not meant to limit the interaction to direct interaction between the elements and may also include indirect interaction between the elements described. Couple may include other terms, such as "connect", "engage", "attach", or any other suitable terms.

As used herein, the term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

As used herein, the term "one embodiment," "an embodiment," "some embodiments," "one aspect," "an aspect," "some aspects," "some implementations," "one implementation," "an implementation," or similar construction means that a particular component, feature, structure, method, or characteristic described in connection with the embodiment, aspect, or implementation is included in at least one embodiment and/or implementation of the claimed subject matter. Thus, the appearance of the phrases "in one embodiment" or "in an embodiment" or "in some embodiments" (or "aspects" or "implementations") in various places throughout the specification are not necessarily all referring to the same embodiment and/or implementation. Furthermore, the particular features, structures, methods, or characteristics may be combined in any suitable manner in one or more embodiments or implementations.

As used herein, the term "exemplary" is used exclusively herein to mean "serving as an example, instance, or illustration." Any embodiment described herein as "exemplary" is not necessarily to be construed as preferred or advantageous over other embodiments.

As used herein, the term "formation" refers to any definable subsurface region. The formation may contain one or more hydrocarbon-containing layers, one or more non-hydrocarbon containing layers, an overburden, and/or an underburden of any geologic formation.

As used herein, the term "hydrocarbons" are generally defined as molecules formed primarily of carbon and hydrogen atoms such as oil and natural gas. Hydrocarbons may also include other elements or compounds, such as, but not limited to, halogens, metallic elements, nitrogen, oxygen, sulfur, hydrogen sulfide ($H_2S$), and carbon dioxide ($CO_2$). Hydrocarbons may be produced from hydrocarbon reservoirs through wells penetrating a hydrocarbon containing formation. Hydrocarbons derived from a hydrocarbon reservoir may include, but are not limited to, petroleum, kerogen, bitumen, pyrobitumen, asphaltenes, tars, oils, natural gas, or combinations thereof. Hydrocarbons may be located within or adjacent to mineral matrices within the earth, termed reservoirs. Matrices may include, but are not limited to, sedimentary rock, sands, silicilytes, carbonates, diatomites, and other porous media.

As used herein, the term "hydrocarbon exploration" refers to any activity associated with determining the location of hydrocarbons in subsurface regions. Hydrocarbon exploration normally refers to any activity conducted to obtain measurements through acquisition of measured data associated with the subsurface formation and the associated modeling of the data to identify potential locations of hydrocarbon accumulations. Accordingly, hydrocarbon exploration includes acquiring measurement data, modeling of the measurement data to form subsurface models, and determining the likely locations for hydrocarbon reservoirs within the subsurface. The measurement data may include seismic data, gravity data, magnetic data, electromagnetic data, and the like. The hydrocarbon exploration activities may include drilling exploratory wells.

As used herein, the term "hydrocarbon development" refers to any activity associated with planning of extraction and/or access to hydrocarbons in subsurface regions. Hydrocarbon development normally refers to any activity conducted to plan for access to and/or for production of hydrocarbons from the subsurface formation and the associated modeling of the data to identify preferred development approaches and methods. By way of example, hydrocarbon development may include modeling of the subsurface formation and extraction planning for periods of production, determining and planning equipment to be utilized and techniques to be utilized in extracting the hydrocarbons from the subsurface formation, and the like.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions, or at ambient conditions (20° Celsius (C) and 1 atmospheric (atm) pressure). Hydrocarbon fluids may include, for example, oil, natural gas, gas condensates, coal bed methane, shale oil, shale gas, and other hydrocarbons that are in a gaseous or liquid state.

As used herein, "hydrocarbon operations" refers to any activity associated with hydrocarbon exploration, hydrocarbon development, collection of wellbore data, and/or hydrocarbon production. It may also include the midstream pipelines and storage tanks, or the downstream refinery and distribution operations.

As used herein, the term "hydrocarbon production" refers to any activity associated with extracting hydrocarbons from subsurface location, such as a well or other opening. Hydrocarbon production normally refers to any activity conducted to form the wellbore along with any activity in or on the well after the well is completed. Accordingly, hydrocarbon production or extraction includes not only primary hydrocarbon extraction, but also secondary and tertiary production techniques, such as injection of gas or liquid for increasing drive pressure, mobilizing the hydrocarbon or treating by, for example, chemicals, hydraulic fracturing the wellbore to promote increased flow, well servicing, well logging, and other well and wellbore treatments.

As used herein, a "mode" refers to a functional state associated with a particular setting, a particular configuration, or a plurality of settings and/or configurations. For example, a mode may involve using a low-frequency effective clock speed to decode incoming signals. As another example, a mode may involve using a high-frequency effective clock speed to decode incoming signals. As yet another example, a mode may involve listening for a signal and may additionally involve using a particular form of detection, such as windowing, sliding window, data smoothing, statistical averaging, trend detection, polyhistogram and the like.

As used herein, "monitored section" and "monitored sections" refer to locations along the tubular members that include sensors and/or are regions of interest.

As used herein, "unmonitored section" and "unmonitored sections" refer to locations along the tubular members that do not include sensors and/or are not regions of interest.

As used herein, the terms "operatively connected" and/or "operatively coupled" means directly or indirectly connected for transmitting or conducting information, force, energy, or matter.

As used herein, the terms "optimal", "optimizing", "optimize", "optimality", "optimization" (as well as derivatives and other forms of those terms and linguistically related words and phrases), as used herein, are not intended to be limiting in the sense of requiring the present invention to find the best solution or to make the best decision. Although a mathematically optimal solution may in fact arrive at the best of all mathematically available possibilities, real-world embodiments of optimization routines, methods, models, and processes may work towards such a goal without ever actually achieving perfection. Accordingly, one of ordinary skill in the art having benefit of the present disclosure will appreciate that these terms, in the context of the scope of the present invention, are more general. The terms may describe one or more of: 1) working towards a solution which may be the best available solution, a preferred solution, or a solution that offers a specific benefit within a range of constraints; 2) continually improving; 3) refining; 4) searching for a high point or a maximum for an objective; 5) processing to reduce a penalty function; 6) seeking to maximize one or more factors in light of competing and/or cooperative interests in maximizing, minimizing, or otherwise controlling one or more other factors, etc.

As used herein, the term "potting" refers to the encapsulation of electrical components with epoxy, elastomeric, silicone, or asphaltic or similar compounds for the purpose of excluding moisture or vapors. Potted components may or may not be hermetically sealed.

As used herein, the terms "range" or "ranges", such as concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a range of about 1 to about 200 should be interpreted to include not only the explicitly recited limits of 1 and about 200, but also to include individual sizes such as 2, 3, 4, etc. and sub-ranges such as 10 to 50, 20 to 100, etc. Similarly, it should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds).

As used herein, the term "sealing material" refers to any material that can seal a cover of a housing to a body of a housing sufficient to withstand one or more downhole conditions including but not limited to, for example, temperature, humidity, soil composition, corrosive elements, pH, and pressure.

As used herein, the term "sensor" includes any electrical sensing device or gauge. The sensor may be capable of monitoring or detecting pressure, temperature, fluid flow, vibration, resistivity, capacitance, strain, acoustics, porosity, fracture properties, or other formation data. Alternatively, the sensor may be a position sensor.

As used herein, the term "stream" refers to fluid (e.g., solids, liquid and/or gas) being conducted through various regions, such as equipment and/or a formation. The equipment may include conduits, vessels, manifolds, units or other suitable devices.

As used herein, the term "subsurface" refers to geologic strata occurring below the earth's surface.

As used herein, the terms "tubular member", "tubular section" or "tubular body" refer to any pipe, such as a joint of casing, a portion of a liner, a drill string, a production tubing, an injection tubing, a pup joint, a buried pipeline, underwater piping, or above-ground piping. Solid lines therein, and any suitable number of such structures and/or features may be omitted from a given embodiment without departing from the scope of the present disclosure.

As used herein, the terms "wellbore" or "downhole" refers to a hole in the subsurface made by drilling or insertion of a conduit into the subsurface. A wellbore may have a substantially circular cross section, or other cross-sectional shape. As used herein, the term "well," when referring to an opening in the formation, may be used interchangeably with the term "wellbore."

As used herein, the term "well data" may include seismic data, electromagnetic data, resistivity data, gravity data, well log data, core sample data, and combinations thereof. Further, the well data may also include temperature, pressures, strain and other similar properties. The well data may be obtained from memory or from the equipment in the wellbore. The well data may also include the data associated with the equipment installed within the wellbore and the configuration of the wellbore equipment. For example, the well data may include the composition of the tubular members, thickness of the tubular members, length of the tubular members, fluid composition within the wellbore, formation properties, cementation within the wellbore and/or other suitable properties associated with the wellbore.

As used herein, "zone", "region", "container", or "compartment" is a defined space, area, or volume contained in the framework or model, which may be bounded by one or more objects or a polygon encompassing an area or volume of interest. The volume may include similar properties.

The exchange of information may be used to manage the operations for different technologies. By way of example, the communication network may include communication nodes disposed along one or more tubular members. The communication nodes may be distributed along casing or tubing within a wellbore, along a subsea conduit and/or along a pipeline, to enhance associated operations. To exchange information, the communication network may include physically connected communication nodes, wirelessly connected communication nodes or a combination of physically connected communication nodes and wirelessly connected communication nodes.

By way of example, the communication network may be used for data exchanges of operational data, which may be used for real-time or concurrent operations, such as operations involving hydrocarbon exploration operations, hydrocarbon development operations, and/or hydrocarbon production operations, for example. In hydrocarbon operations, the system or method may involve acoustically communicating via communication networks (e.g., an acoustic downhole wireless network), which may include various communication nodes spaced-apart along a length of a tone transmission medium (e.g., conduits). These communication nodes may exchange signals with each other to manage the exchange of data within the wellbore and with a computer system that is utilized to manage the hydrocarbon operations. By way of example, the communication nodes may exchange packets via one or more frequencies of acoustic tones transmitted and/or received via the tone transmission medium.

In certain configurations, the communication nodes may include a housing that isolates various components from the wellbore environment. In particular, the communication nodes may include one or more encoding components, which may be configured to generate and/or to induce one or more acoustic tones within tone transmission medium, such as a tubular member or liquid inside the tubular member. Alternately, conduit refers to an acoustic channel of liquid which may, for example, exist between the formation and a tubular member. In addition, the communication nodes may include one or more decoding components, which may be configured to receive and/or decode acoustic tones from the tone transmission medium. The decoding components may include filters to modify the received signals, which may include a high pass filter, for example. The communication nodes may include one or more power supplies configured to supply energy to the other components, such as batteries. The communication nodes may include one or more sensors, which may be configured to obtain measurement data associated with the downhole environment and/or the formation. The communication nodes may include relatively small transducers to lessen the size of the communication nodes, such that they may be disposed or secured to locations having limited clearance, such as between successive layers of downhole tubular members. The smaller transducers have higher acoustic resonant frequencies compared to larger transducers and thus use less energy to send acoustic signals around the resonant frequency band as compared with the larger transducers around their respective resonant frequency bands. By way of example, the transducer may transmit out high frequency signals consuming less power due to the small size transducer's intrinsic resonant frequency being high, while the transducer may receive the same high frequency acoustic signals. A benefit from using a small transmitting transducer and receiving transducer, is that small factor transducers enable a compact communication node.

Because of the problems encountered in wellbore environments, downhole communications should be robust, relatively low cost, and may be configured to provide sensing information from the physical sampling and number of sensing points. To address the problems, low frequency acoustic networks may be utilized, but the low frequency acoustic networks tend to be large, expensive, and/or provide limited data rates. The size of low-frequency communication nodes (e.g., acoustic telemetry devices that utilize lower frequencies) preclude fine sampling (e.g., near each fracture cluster in a hydraulic fracturing stage). To provide measurement data, a high-frequency network may be utilized and may include high-frequency communication nodes, such as ultrasonic sensing and telemetry communication nodes. The high-frequency communication nodes provide smaller device dimensions and lower expense for positioning various communication nodes at locations along a wellbore (e.g., at points along a multizone completion). However, the high-frequency communication nodes may involve a larger number of communication nodes as compared to the lower frequency acoustic networks because of the limited range of such communication nodes that utilize lower frequencies. Such a configuration of communication nodes may be expensive for vertical sections of a wellbore. By way of example, the vertical sections may include distances of about 10,000 feet between the surface and equipment within the wellbore. For the higher frequency wireless network, a communication node has to be installed about every 40 feet, which would involve the use of 250 devices for a vertical section of 10,000 feet. As another example, the communication node may be installed about every 80 feet, which would involve the use of 125 communication nodes for the vertical section of 10,000 feet.

The present techniques include a configuration for a downhole communication network that includes a combination of two or more types of networks (e.g., a low-frequency network of one or more low-frequency communication nodes, high-frequency network of one or more high-frequency communication nodes and/or wired communication nodes) may offer enhancements to the hydrocarbon operations. By way of example, the combination of different types of wireless networks may include using low-frequency communication nodes for locations that do not involve sensing (e.g., in an uncompleted vertical section of a wellbore). The low-frequency network may involve a low frequency, long range telemetry system that may be utilized for optimal performance with less system complexity (e.g., down-hole distances at over a thousand feet). The high-frequency network may include high-frequency communication nodes that may be used for locations that involve sensing (e.g., near completions or zones of interest). The high-frequency communication nodes may generate and receive higher frequency propagating waves or vibrations as compared to a low frequency propagating waves used by the low frequency communication nodes. The wired network may include wired communication nodes that may be used for locations that involve sensing (e.g., near completions or zones of interest) and may generate and receive propagating waves or vibrations. Accordingly, the communication network may involve optimizing or tuning the speed of communication, lessening cost of the network, enhancing reliability of the network, lessening interference with operations and production and/or providing the preferred sensing density.

The present techniques may involve combining two or more types of communication networks to enhance operations, which may include hydrocarbon operations. The two or more downhole types of communication networks may be utilized to match complexity for a specific configurations, and may be used to optimize cost, speed and performance for a particular application in each of the zones along tubular members (e.g., within a wellbore). The two or more types of communication networks, such as wireless networks, which may include low-frequency network, high-frequency network, and/or radio network. As a result, different communication nodes may be used to form the different networks. The communication nodes may include one or more low-frequency communication nodes, one or more high-frequency communication nodes; one or more dual network communication nodes or interface communication nodes (e.g., communication nodes configured to communicate with high-frequencies and low-frequencies signals); and/or one or more communication nodes that are configured to communicate with low and/or high frequency radio frequencies (RF). By way of example, ultrasound-based acoustic telemetry communication nodes, which may include telemetry ranging from 10 feet to 100 feet, may be configured to provide higher density of communication nodes in specific zones (e.g., multizone completion horizontal sections), while low frequency acoustic telemetry communication nodes may span other zones (e.g., a vertical section above the horizontal sections) with only a few low frequency communication nodes (e.g., 1000 feet range). Higher density of communication nodes may involve a few meters or 10 feet to 40 feet versus one sensing point every 1,000 feet to 3,000 feet.

By way of example, the configuration may include a combination of two or more types of wireless networks, which may include different communication nodes. The communication nodes may include low-frequency communication nodes; high-frequency communication nodes; communication nodes configured to communicate with high-frequencies and low-frequencies signals and communication nodes that are configured to communicate with low and/or high frequency radio frequencies (RF). The low-frequency communication nodes may be configured to transmit signals and to receive signals that are less than or equal to ($\leq$) 200 kHz, $\leq$100 kHz, $\leq$50 kHz, or $\leq$20 kHz. In particular, the low-frequency communication nodes may be configured to exchange signals in the range between 100 Hz and 20 kHz; in the range between 1 kHz and 20 kHz; and in the range between 5 kHz and 20 kHz. Other configurations may include low-frequency communication nodes, which may be configured to exchange signals in the range between 100 Hz and 200 kHz; in the range between 100 Hz and 100 kHz; in the range between 1 kHz and 200 kHz; in the range between 1 kHz and 100 kHz; in the range between 5 kHz and 100 kHz and in the range between 5 kHz and 200 kHz. The communication nodes may also include high-frequency communication nodes configured to transmit and receive signals that are greater than (>) 20 kHz, >50 kHz, >100 kHz or >200 kHz. Also, the high-frequency communication nodes may be configured to exchange signals in the range between greater than 20 kHz and 1 MHz, in the range between greater than 20 kHz and 750 kHz, in the range between greater than 20 kHz and 500 kHz. Other configurations may include high-frequency communication nodes, which may be configured to exchange signals in the range between greater than 100 kHz and 1 MHz; in the range between greater than 200 kHz and 1 MHz; in the range between greater than 100 kHz and 750 kHz; in the range between greater than 200 kHz and 750 kHz; in the range between greater than 100 kHz and 500 kHz; and in the range between greater than 200 kHz and 500 kHz.

In certain configurations, the present techniques may include communication nodes that include dual network functionality (e.g., high-frequency and low-frequency acoustic and/or vibration telemetry, and/or acoustic telemetry combined with radio frequency). The communication nodes may be configured to communicate with two or more types of wireless networks at the boundaries (e.g. low-frequency or high-frequency communication nodes near each other). Such communication nodes may be referred to as dual frequency communication nodes or interface communication nodes. The interface communication nodes may include additional piezoelectric transducers or other vibration generation capabilities, or piezoelectric transducers and radio frequency antennas.

In other configurations, the communication nodes may include two or more types of communication nodes, which may be used for different purposes. By way of example, the high-frequency communication nodes may include sensing capabilities for use in sections where data should be measured and collected. In other configurations, the communication nodes may not include sensing capabilities, which may not include sensing capabilities for cost optimization, but may focus on communication capabilities. The communication nodes may be optimized separately based on its primary functionality.

In a first configuration, two or more wireless communication nodes may be utilized to provide redundancy. By way of example, high-frequency communication nodes (e.g., acoustic telemetry communication nodes configured to operate at high frequencies) may be disposed in two or more sections of a wellbore. For example, the low-frequency communication nodes (e.g., acoustic telemetry communication nodes configured to operate at low-frequencies) may be positioned at half or less of the reliable communication range for the respective types of wireless networks. This configuration may be less complicated than other network configurations. This configuration may include a large number of communication nodes, as the communication nodes may be associated with different types of wireless networks. In addition, wireless communication nodes may also be utilized with wired communication nodes to provide redundancy for this system.

In a second configuration, the communication network may include a first type of wireless network or a first wired network for unmonitored sections, while a second type of wireless network may be used in monitored sections. By way of example, a high-frequency network of high-frequency communication nodes may be disposed in the sections of the wellbore to be monitored (e.g., zones of interest), while low-frequency communication nodes may be disposed in other sections of the wellbore that are not being monitored. The physical spacings between high-frequency communication nodes may depend on the adjacent environment, as well as application-driven sensing requirements. The communication nodes in the transition sections between low-frequency networks and high-frequency networks, such as the interface communication nodes, may be configured specifically to provide the data streaming, buffering, and/or temporary storing capabilities. In addition, wireless communication nodes may also be utilized with wired communication nodes that may be utilized in the unmonitored sections and/or in the monitored sections.

In a third configuration, the downhole communications network may include a first type of wireless network to manage communication along the wellbore as a primary network through the wellbore, while a second type of wireless network or a wired network may be used as clusters within the wellbore. By way of example, high-frequency communication nodes may be disposed in specific sections that are to be monitored or clusters, while the low-frequency communication nodes may be dispersed along the wellbore through the various sections, such as the sections to be monitored and in the sections not to be monitored. The low-frequency communication nodes may be configured to operate as a primary network (e.g., data hubs, gateway, and/or redundancy nodes in the network). The data collected from the high-frequency communication nodes may be transmitted to the intermediate low-frequency communication nodes for data relay purposes. With the low-frequency communication nodes forming various low-frequency networks, as clusters, the low frequency networks may be integrated with the high-frequency network, which includes the high-frequency communication nodes disposed in the various sections, which may be spatially far away from each other in clusters of high-frequency networks. Furthermore, the low-frequency communication nodes may also provide communication path redundancy for environments where the communication between high-frequency communication nodes is weak or cannot be established.

In a fourth configuration, the downhole wireless network may include a first type of wireless network for unmonitored sections, while a second type of wireless network may be used in monitored sections and a third type of wireless network may be used in other unmonitored sections. By way of example, high-frequency communication nodes may be disposed in the sections to be monitored (e.g., zones of interest), while low-frequency communication nodes may be disposed in other sections that are not being monitored, which is similar to the second configuration. In addition, radio-frequency communication nodes may be utilized to provide radio-frequency wireless communications and may be configured to communicate with the low-frequency communication nodes and/or high-frequency communication nodes. Radio-frequency communication nodes may be utilized in the sections that are determined to be preferred for communication medium for radio frequency. The communication nodes in the transition sections between radio frequency communication nodes and low-frequency and/or high-frequency acoustic networks may be configured to provide the data streaming, buffering, and/or temporary storing capabilities. In addition, wireless communication nodes may also be utilized with wired communication nodes that may be utilized in the vertical sections and/or in the monitored sections.

In various configurations, the use of the different types of wireless networks of communication nodes may be used to tune a combined network. The tuning of the combined wireless network may involve varying acoustic and/or vibration utilized based on a well structure, media, casing condition.

The creation of the communication network may be influenced by various aspects. As a first aspect, the local media, such as clay or cement around tubular member, may prefer or operate better with high-frequency signals or low-frequency signals. However, the local media may be secondary as the casing waveguide dominates. As a second aspect, a combination of low-frequency signals and high-frequency signals may be used to provide flexibility in the range or distance spanned by communication nodes. For example, the configuration may preferably dispose high-frequency communication nodes near regions of interest (e.g., casing perforations, producing sleeves or other locations of hydrocarbon operations), where the size, cost and mass of low-frequency communication nodes may preclude the use of the low-frequency communication nodes. The low-frequency communication nodes may be disposed in regions that are not being monitored to provide greater spacing between communication nodes.

As may be appreciated, wireless communication via higher frequency signals may achieve a higher data rate than that via low frequency signals. Accordingly, an interface between high-frequency and low-frequency networks (e.g., high-frequency communication nodes and low-frequency communication nodes) may result in data loss unless specific steps are performed to manage the communication exchange. In addition, utilizing different types of communication nodes may limit the operation of the combined networks by limiting the speed and throughput of communication based on the slowest communication nodes in the network. As a result, the high-frequency communication nodes may operate at extremely slow rates to not overload the low-frequency communication nodes. Accordingly, the interface between high-frequency and low-frequency networks or even between wired and wireless networks may be performed in various interface configurations.

A first interface configuration may involve a buffering configuration. In such a configuration, each of the interface communication nodes may include sufficient memory (e.g., additional memory to handle communications) and may include compression algorithms. The interface communication node may receive data from the high-frequency communication nodes in the high-frequency network at full speed, while simultaneously transmitting the data to the low-frequency communication nodes in the low-frequency network at full speed for that network. The buffer may include a queue to which data is added at one end, when received, then removed at the other end when transmitted. Beneficially, the buffering configuration provides the ability to communicate on the low-frequency network and the high-frequency network and to operate at full speed (and simultaneously) for the respective networks, which results in more efficient utilization of the communication channels. Further, the buffering configuration provides significant energy savings for high-frequency communication nodes because the high-frequency communication nodes may perform the transmissions and enter the sleep mode to conserve power quicker than similar low-frequency communication nodes may perform the transmission of similar data. Another benefit is the ability to compress or to summarize the accumulated data prior to transmission by the low-frequency communication nodes in the low-frequency network, which mitigates the slower performance of the low-frequency communication nodes on the low-frequency network by lessening the volume of data exchanged over the low-frequency network. This configuration may also be utilized for exchanges between wired networks and wireless networks.

The buffering configuration involves the use of sufficient memory to accommodate the longest possible transmission from the high-frequency communication nodes in the high-frequency network (or conversely, the limitation of high-frequency network transmission is the size of memory on the interface communication node). The ability to perform compression or summarization to the pending data buffer in the interface communication nodes may be a different configuration from other communication nodes that do not have to perform such buffering (e.g., other communication nodes may manage cached data as static). Indeed, other communication nodes consider the liability of accumulated data (and increased latency), while the interface communication nodes provide the ability to compress or to summarize the data to enhance performance and/or enhance energy savings on the slower network (e.g., the low-frequency network). The communication nodes may include buffer memory and may be configured to perform queue behaviors, which may use compression or may not use compression. Buffering and compression may occur when transmitting from high-frequency to low-frequency (e.g., from fast to slow).

A second interface configuration may involve a pacing configuration. The pacing configuration may include one or more interface communication nodes that may be configured to transmit on the high-frequency network, which may send data every $N^{th}$ symbol time or interval to account for the slower data transmission by the low-frequency communication nodes on the low-frequency network. In such a configuration, the interface communication nodes may be configured to maintain pace between incoming and outgoing data. The high-frequency communication nodes on the high-frequency network may continue to operate normally when not transmitting to the interface communication nodes. This approach does not limit the size of the transmission from the high-frequency network and does not involve larger or excessive buffer memory on the interface communication nodes. Further, the high-frequency communication nodes may enter a sleep mode between transmitted symbols, thereby saving significant energy. This configuration may also be utilized for exchanges between wired networks and wireless networks.

In certain configurations, the communication nodes may be configured to utilize aliasing to enhance the communications. In such configurations, the communication node may utilize a high-frequency transducer for transmitting signals and a high-frequency transducer to receive signals because it may be configured to handle signals that are aliased. By way of example, the communication nodes may include a processor that operates at one or more effective clock speeds. The communication nodes may operate at a high-frequency effective clock speed and/or a low-frequency effective clock speed. The effective clock speed is the clock speed at which the processor operates after inclusion of applicable clock multipliers or clock dividers. As a result, the sampling frequency is equal to the effective clock speed, while the telemetry frequency is the frequency of a given telemetry tone. The communication network may use aliasing to enable low-frequency effective clock speeds to be used in the communication nodes to receive signals and the high-frequency effective clock speeds may be used in the communication nodes to transmit signals, which is a configuration that saves energy. As a result, the communication node may be configured to be more energy efficient for transmitting signals by using a high-speed effective clock speed and receiving signals by using a low-speed effective clock speed. By way of example, the ratio of the low-frequency effective clock speed to the high-frequency effective clock speed may be greater than 1:2 (e.g., the ratio includes ratios of 1:3, 1:5, 1:9, etc.); may be greater than 1:4; may be greater than 1:10; in a range between 1:2 and 1:1000; in a range between 1:4 and 1:100 and/or in a range between 1:10 and 1:80. In other configurations, the Nyquist frequency is associated with the receiving communication node and is based on the effective clock speed in force at the receiving communication node. For example, the transmitted signal frequency may be greater than the Nyquist frequency; may be greater than two times the Nyquist frequency; may be greater than three times the Nyquist frequency; or the transmitted signal frequency may be greater than four times the Nyquist frequency. The ratio of the Nyquist frequency to the transmitted signal frequency may be in the range between 1:1 and 1:1,000; may be in a range between 1:1 and 1:100 and/or may be in a range between 1:1 and 1:10. As another example, the transmitted signal, which may be at a frequency higher than the sampling frequency, may be decoded to provide the information for decoding the remainder of the packet.

In other configurations, the method and system include mechanisms for conserving power in the communication nodes of the communication network (e.g., acoustic wireless network). The power conservation may include repeatedly and sequentially cycling a given communication node of the plurality of communication nodes for a plurality of cycles by entering a lower power state for a lower power state duration and subsequently transitioning to a listening state for a listening state duration. The low-power state duration is greater than the listening state duration. These methods also include transmitting, during the cycling and via a tone transmission medium, a transmitted acoustic tone for a tone transmission duration, receiving a received acoustic tone, and, responsive to the receiving, interrupting the cycling by transitioning the given communication node to an active state. The tone transmission duration is greater than the low-power state duration such that the acoustic wireless network detects the transmitted acoustic tone regardless of when the transmitting is initiated.

In one or more configurations, the communication network may be a wireless communication network that includes different types of wireless communication types. The wireless communication networks may include high-frequency communication networks, which include high-frequency communication nodes, and/or low-frequency communication networks, which include low-frequency communication nodes. By way of example, the present techniques may include a configuration that utilizes different types of communication nodes (e.g., low-frequency communication nodes and/or high-frequency communication nodes) to form the communication network, which may include different types of networks. These different communication nodes may be distributed along one or more tubular members, which may be within a wellbore, along a pipeline, or along a subsea tubular member, to enhance operations. The communication nodes may include using low-frequency communication nodes at locations that do not involve sensing (e.g., in an uncompleted vertical section). The low-frequency communication nodes may involve a low-frequency range, which may be utilized for optimal performance with low system complexity. The high-frequency communication nodes may be used for locations that involve sensing (e.g., near completions or zones of interest). The high-frequency communication nodes may involve a higher frequencies as compared to a low-frequencies used by the low-frequency communication nodes.

As a further example, the communication network may include low-frequency communication nodes; high-frequency communication nodes; wired communication nodes; communication nodes configured to communicate with high-frequencies and low-frequencies signals (e.g., acoustic signals and/or vibration signals) and communication nodes that are configured to communicate with low and/or high frequency radio frequencies (RF). The low-frequency communication nodes may be configured to transmit signals and to receive signals that are less than or equal to ($\leq$) 200 kHz, $\leq$100 kHz, $\leq$50 kHz, or $\leq$20 kHz. In particular, the low-frequency communication nodes may be configured to exchange signals in the range between 100 Hz and 20 kHz; in the range between 1 kHz and 20 kHz; and in the range between 5 kHz and 20 kHz. Other configurations may include low-frequency communication nodes, which may be configured to exchange signals in the range between 100 Hz and 200 kHz; in the range between 100 Hz and 100 kHz; in the range between 1 kHz and 200 kHz; in the range between 1 kHz and 100 kHz; in the range between 5 kHz and 100 kHz and in the range between 5 kHz and 200 kHz. The communication nodes may also include high-frequency communication nodes configured to transmit and receive signals that are greater than ($>$) 20 kHz, $>$50 kHz, $>$100 kHz or $>$200 kHz. Also, the high-frequency communication nodes may be configured to exchange signals in the range between greater than 20 kHz and 1 MHz, in the range between greater than 20 kHz and 750 kHz, in the range between greater than 20 kHz and 500 kHz. Other configurations may include high-frequency communication nodes, which may be configured to exchange signals in the range between greater than 100 kHz and 1 MHz; in the range between greater than 200 kHz and 1 MHz; in the range between greater than 100 kHz and 750 kHz; in the range between greater than 200 kHz and 750 kHz; in the range between greater than 100 kHz and 500 kHz; and in the range between greater than 200 kHz and 500 kHz.

In one or more configurations, the communication network may include a physical connection or wired network. The physical connections may include one or more cables, one or more electrical conductors and/or one or more fiber optic cables, which may be secured to a tubular member and used to evaluate subsurface conditions. The physical connection may be secured to an inner portion of the tubular member and/or an outer portion of the tubular member. The physical connection provides a hard wire connection that may provide concurrent or real-time exchange of data packets within the wellbore. In addition, the physical connection may be used to provide power directly to communication nodes and/or downhole sensors.

In other configurations, as physical cables may be difficult to deploy along tubular members in certain environments (e.g., a wellbore), the communication network may include a combination of one or more wireless networks with one or more physical connection networks. In such a configuration, the physical connection network of communication nodes may be disposed at locations that do not involve sensing (e.g., in an uncompleted vertical section), while the wireless network of communication nodes may be disposed at locations in horizontal sections of the wellbore or sections that involve sensing (e.g., monitored sections of the wellbore). Another configuration may include using wireless network of communication nodes for long range communications, while the wired physical connections network of communication nodes may be used for monitored sections of the wellbore to handle the high speed data transmissions within those sections.

Accordingly, the present techniques may enhance the hydrocarbon operations through the use of the wireless network. For example, a method for communicating data among a plurality of communication nodes along one or more tubular members is described. The method comprising: providing a communication network that comprises a first type of communication network and a second type of communication network; disposing a first plurality of communication nodes along one or more tubular members to form the first type of communication network; disposing a second plurality of communication nodes along the one or more tubular members to form the second type of wireless network; obtaining measurements within the along the one or more tubular members; communicating the obtained measurements via signals over the first type of communication network and the second type of communication network to a control unit; and performing hydrocarbon operations with the obtained measurements.

In one or more configurations, the method may include various enhancements. The method may include wherein the first type of communication network and the second type of communication network are different types of communication networks (e.g., wireless networks); exchanging high-frequency signals via the second plurality of communication nodes, and one of exchanging low-frequency signals with the first plurality of communication nodes, exchanging acoustic high-frequency signals or acoustic low-frequency signals with the first plurality of communication nodes; exchanging vibration high-frequency signals or vibration low-frequency signals with the first plurality of communication nodes and exchanging low radio frequency signals or high radio frequency signals with the first plurality of communication nodes and any combination thereof; wherein the low-frequency signals are less than or equal to ($\leq$) 20 kilohertz, in the range between 100 hertz and 20 kilohertz, or in the range between 1 kilohertz and 20 kilohertz; wherein the high-frequency signals are greater than ($>$) 20 kilohertz, in the range between greater than 20 kilohertz and 1 megahertz, or in the range between greater than 20 kilohertz and 500 kilohertz; wherein the first type of communication network is a wired network and the second type of communication network is a wireless network; wherein the first plurality of communication nodes comprise two or more low-frequency communication nodes and the first type of communication network operates with low-frequency signals; and the second plurality of communication nodes comprise two or more high-frequency communication nodes and the second type of communication network operates with high-frequency signals; wherein the first plurality of communication nodes and the second plurality of communication nodes are disposed along the one or more tubular members to provide redundant communications along the one or more tubular members; wherein the first plurality of communication nodes are disposed in unmonitored sections along the one or more tubular members and the second plurality of communication nodes are disposed in monitored sections along the one or more tubular members; a third plurality of communication nodes of a third type of communication network disposed along the one or more tubular members, wherein the third plurality of communication nodes are configured to communicate with one or more of the first plurality of communication nodes and the second plurality of communication nodes; exchanging data packets between the first type of communication network and the second type of communication network via one or more interface communication nodes; wherein the one or more interface communication nodes include a memory and at least one compression algorithm configured to compress data being passed from the first type of communication network to the second type of communication network, wherein the first type of communication network is in a higher frequency range than the second type of communication network; wherein the one or more interface communication nodes include memory configured to store received data packets from the first type of communication network and the second type of communication network; to transmit data packets to the first type of communication network from the second type of communication network; and to transmit data packets to the second type of communication network from the first type of communication network; wherein the one or more interface communication nodes are configured to simultaneously transmit packets to the first type of communication network from the second type of communication network and transmit packets to the second type of communication network from the first type of communication network; wherein the one or more interface communication nodes include memory configured to store received data packets from the first type of communication network and the second type of communication network; to transmit data packets to the first type of communication network from the second type of communication network; and to transmit data packets to the second type of communication network from the first type of communication network, wherein the data packets are transmitted on the first type of communication network at one of a plurality of time intervals and transmitted at each interval for the second type of communication network to account for the slower data transmission on the second type of communication network; disposing the one or more tubular members within a wellbore and the control unit is located at the surface of the wellbore; disposing the plurality of communication nodes and the one or more tubular members along a subsea conduit; and/or disposing the plurality of communication nodes and the one or more tubular members along a pipeline.

In another configuration, a communication system for communicating data along one or more tubular members is described. The system may comprise: a first plurality of communication nodes disposed along the one or more tubular members to form a first type of communication network; a second plurality of communication nodes disposed along the one or more tubular members to form a second type of communication network, wherein the second type of communication network operates at a different frequency range from the first type of communication network; and a control unit configured to exchange data with the communication network.

In other configurations, the system may include various enhancements. The system may include: wherein the first type of communication network and the second type of communication network are different types of wireless networks; wherein the first plurality of communication nodes comprise one of one or more low-frequency communication nodes, one or more communication nodes configured to communicate with acoustic high-frequencies signals and acoustic low-frequencies signals; one or more communication nodes configured to communicate with vibration high-frequencies signals and vibration low-frequencies signals; one or more communication nodes that are configured to communicate with low radio frequencies signals and/or high frequency radio frequencies signals and any combination thereof; and the second plurality of communication nodes comprise one or more high-frequency communication nodes; wherein the low-frequency communication nodes are configured to transmit and receive signals that are less than or equal to ($\leq$) 20 kilohertz, in the range between 100 hertz and 20 kilohertz, or in the range between 1 kilohertz and 20 kilohertz; wherein the high-frequency communication nodes are configured to transmit and receive signals that are greater than ($>$) 20 kilohertz, in the range between greater than 20 kilohertz and 1 megahertz, or in the range between greater than 20 kilohertz and 500 kilohertz; wherein the first type of communication network is a wired network and the second type of communication network is a wireless network; wherein the first plurality of communication nodes comprise two or more low-frequency communication nodes and the first type of communication network operates with low-frequency signals; and the second plurality of communication nodes comprise two or more high-frequency communication nodes and the second type of communication network operates with high-frequency signals; wherein the first plurality of communication nodes and the second plurality of communication nodes are disposed along the one or more tubular members to provide redundant communications along the one or more tubular members; wherein the first plurality of communication nodes are disposed in unmonitored sections along the one or more tubular members and the second plurality of communication nodes are disposed in monitored sections along the one or more tubular members; a third plurality of communication nodes of a third type of communication network disposed along the one or more tubular members, wherein the third plurality of communication nodes are configured to communicate with one or more of the first plurality of communication nodes and the second plurality of communication nodes; one or more interface communication nodes configured to exchange data packets between the first type of communication network and second type of communication network; wherein the one or more interface communication nodes include a memory and at least one compression algorithm configured to compress data being passed from the first type of communication network to the second type of communication network, wherein the first type of communication network operates in a higher frequency range than the second type of communication network; wherein the one or more interface communication nodes include memory configured to store received data packets from the first type of communication network and the second type of communication network; to transmit data packets to the first type of communication network from the second type of communication network; and to transmit data packets to the second type of communication network from the first type of communication network; wherein the one or more interface communication nodes are configured to simultaneously transmit data packets to the first type of communication network from the second type of communication network and transmit data packets to the second type of communication network from the first type of communication network; wherein the one or more interface communication nodes include memory configured to store received data packets from the first type of communication network and the second type of communication network; to transmit data packets to the first type of communication network from the second type of communication network; and to transmit data packets to the second type of communication network from the first type of communication network, wherein the data packets are transmitted on the first type of communication network at one of a plurality of time intervals and transmitted at each interval for the second type of communication network to account for the slower data transmission on the second type of communication network; and/or wherein the one or more tubular members are disposed within a wellbore, are disposed within a subsea conduit or are disposed within a pipeline.

Beneficially, the present techniques provide various enhancements for the hydrocarbon operations. The present techniques may utilize two or more types of wireless networks and associated communication nodes, which provide flexibility in the downhole wireless communication. Accordingly, the present techniques may be further understood with reference to FIGS. 1 to 8B, which are described further below.

FIG. 1 is a schematic representation of a well 100 configured that utilizes a wireless network that includes two or more types of communication nodes. The well 100 includes a wellbore 102 that extends from surface equipment 120 to a subsurface region 128. Wellbore 102 also may be referred to herein as extending between a surface region 126 and subsurface region 128 and/or as extending within a subterranean formation 124 that extends within the subsurface region. The wellbore 102 may include a plurality if tubular sections, which may be formed of carbon steel, such as a casing or liner. Subterranean formation 124 may include hydrocarbons. The well 100 may be a hydrocarbon well, a production well, and/or an injection well.

Well 100 also includes a communication network (e.g., an acoustic wireless network). The communication network may be a downhole acoustic wireless network that includes a plurality of communication nodes 114 and a topside communication node or control unit 132. The communication nodes 114 may be spaced-apart along a tone transmission medium 130 that extends along a length of wellbore 102. In the context of well 100, tone transmission medium 130 may include a downhole tubular 110 that may extend within wellbore 102, a wellbore fluid 104 that may extend within wellbore 102, a portion of subsurface region 128 that is proximal wellbore 102, a portion of subterranean formation 124 that is proximal wellbore 102, and/or a cement 106 that may extend within wellbore 102 and/or that may extend within an annular region between wellbore 102 and downhole tubular 110. Downhole tubular 110 may define a fluid conduit 108.

To communicate within the wellbore 102 and with the control unit 132, a downhole communication network may be utilized, which may include a combination of two or more types of wireless networks and/or wired networks, which may include different communication nodes associated with the respective networks. The communication nodes 114 may include low-frequency communication nodes; high-frequency communication nodes; wired communication nodes; communication nodes configured to communicate with high-frequencies and low-frequencies signals and communication nodes that are configured to communicate with low and/or high frequency radio frequencies (RF). By way of example, each of the communication nodes 114 may include one or more encoding components 116, which may be configured to generate an acoustic tone, such as acoustic tone 112, and/or to induce the acoustic tone within tone transmission medium 130. Communication nodes 114 also may include one or more decoding components 118, which may be configured to receive acoustic tone 112 from the tone transmission medium. A communication node 114 may function as both an encoding component 116 and a decoding component 118 depending upon whether the given communication node is transmitting an acoustic tone (e.g., functioning as the encoding component) or receiving the acoustic tone (i.e., functioning as the decoding component). The communication nodes 114 may include both encoding and decoding functionality, or structures, with these structures being selectively utilized depending upon whether or not the given communication node is encoding the acoustic tone or decoding the acoustic tone. In addition, the communication nodes 114 may include sensing components that are utilized to measure and monitor conditions within the wellbore 102.

In well 100, transmission of acoustic tone 112 may be along a length of wellbore 102. As such, the transmission of the acoustic tone may be linear, at least substantially linear, and/or directed, such as by tone transmission medium 130. The generated tones or signals propagate both up the conduit (e.g., tubular member), down the conduit and into the surrounding layers, such as cement, casing, liquid inside the casing, and the formation, to varying degrees depending on the acoustic impedance of the material. Such a configuration may be in contrast to more conventional wireless communication methodologies, such as Wi-Fi communications, which generally may transmit a corresponding wireless signal in a plurality of directions, or even in every direction.

The communication nodes 114, which are discussed in more detail herein, are disclosed in the context of well 100, such as a hydrocarbon well. However, it is within the scope of the present disclosure that these methods may be utilized to communicate via an acoustic tones or signals in any suitable communication network (e.g., acoustic wireless network and/or wired network). As examples, the communication network may be used in a subsea well and/or in the context of a subsea tubular member that extends within a subsea environment. Under these conditions, the tone transmission medium may include, or be, the subsea tubular and/or a subsea fluid that extends within the subsea environment, proximal the subsea tubular, and/or within the subsea tubular. As another example, the acoustic wireless network in the context of a surface tubular that extends within the surface region. Under these conditions, the tone transmission medium may include, or be, the surface tubular and/or a fluid that extends within the surface region, proximal the surface tubular, and/or within the surface tubular.

The plurality of frequencies, which are utilized in the communication nodes 114, may include the first frequency range for a first wireless network type and/or a second frequency range for a second wireless network type. Each of the types of wireless networks may be utilized in different portions of the wellbore to provide the communication for the hydrocarbon operations. The respective frequency ranges may be any suitable values. As examples, each frequency in the plurality of high-frequency ranges may be at least 20 kilohertz (kHz), at least 25 kHz, at least 50 kHz, at least 60 kHz, at least 70 kHz, at least 80 kHz, at least 90 kHz, at least 100 kHz, at least 200 kHz, at least 250 kHz, at least 400 kHz, at least 500 kHz, and/or at least 600 kHz. Additionally or alternatively, each frequency in the plurality of high-frequency ranges may be at most 1,000 kHz (1 megahertz (MHz)), at most 800 kHz, at most 750 kHz, at most 600 kHz, at most 500 kHz, at most 400 kHz, at most 200 kHz, at most 150 kHz, at most 100 kHz, and/or at most 80 kHz. Further, each frequency in the low-frequency ranges may be at least 20 hertz (Hz), at least 50 Hz, at least 100 Hz, at least 150 Hz, at least 200 Hz, at least 500 Hz, at least 1 kHz, at least 2 kHz, at least 3 kHz, at least 4 kHz, and/or at least 5 kHz. Additionally or alternatively, each frequency in the high-frequency ranges may be at most 10 kHz, at most 12 kHz, at most 14 kHz, at most 15 kHz, at most 16 kHz, at most 17 kHz, at most 18 kHz, and/or at most 20 kHz.

Figure 2A:
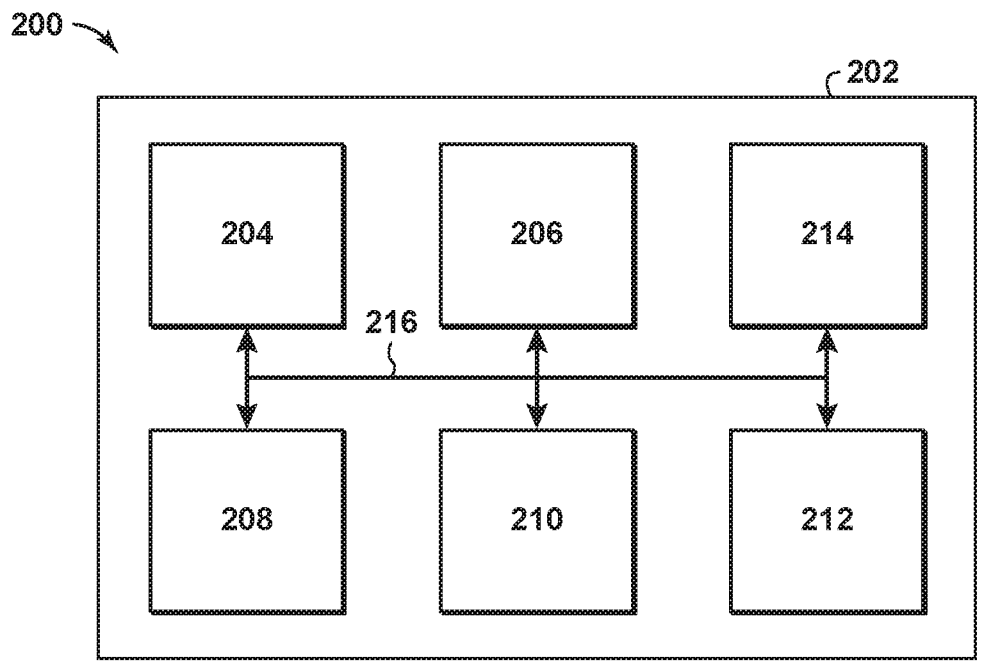
FIGS. 2A and 2B are exemplary views of communications nodes of FIG. 1.
Figure 2B:
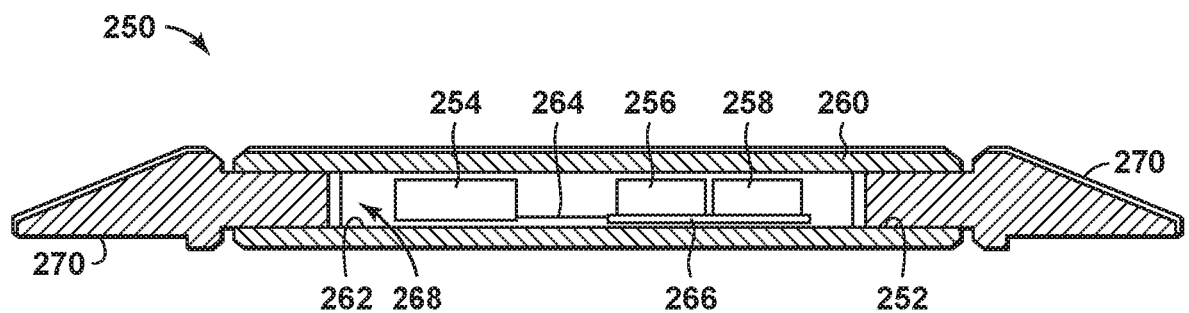

The communication nodes 114 may include various configurations, such as those described in FIGS. 2A and 2B. The communications node may be disposed on a conduit and/or a tubular section within the wellbore. The communication nodes may be associated with equipment, may be associated with tubular members and/or may be associated with the surface equipment. The communication nodes may also be configured to attach at joints, internal or external surfaces of conduits, surfaces within the wellbore, or to equipment.

As a specific example, the communications nodes may be structured and arranged to attach to the surface (e.g., internal or external surface) of conduits at a selected location. This type of communication node may be disposed in a wellbore environment as an intermediate communications node between the surface and any communication nodes associated with the equipment. The communication nodes may be disposed on each tubular member, or may be disposed on alternative tubular members. By way of example, the communications node may be welded onto the respective surface or may be secured with a fastener to the tubular member (e.g., may be selectively attachable to or detachable from tubular member). The fastener may include the use of clamps (not shown), an epoxy or other suitable acoustic couplant may be used for bonding (e.g., mechanically or chemical bonding). By attaching to the external surface of the tubular member, the communication nodes may not interfere with the flow of fluids within the internal bore of the tubular section. The devices may also or alternately operate at high frequencies.

FIG. 2A is a diagram 200 of an exemplary communication node. The communication node 200 may include a housing 202 along with a processor or central processing unit (CPU) 204, memory 206, one or more encoding components 208, one or more decoding components 210, a power component 212 and/or one or more sensing components 214, which communicate via a bus 216. The central processing unit (CPU) 204 may be any general-purpose CPU, although other types of architectures of CPU 204 may be used as long as CPU 204 supports the inventive operations as described herein. Also, the CPU 204 may include be a system on chip, programmable system-on-chip, digital signal processor, application specific integrated circuit, microprocessor, microcontroller, single processor, multiple processors (including different types/speeds), discrete processor, field programmable gate array and/or other processor-like device. Further, the communication node may include a clock or the CPU 204 may include and/or operate at different effective clocks speeds, such as low-frequency and/or high-frequency. The CPU 204 may execute the various logical instructions according to disclosed aspects and methodologies. For example, the CPU 204 may execute machine-level instructions for performing processing according to aspects and methodologies disclosed herein. The memory 206 may include random access memory (RAM), such as SRAM, DRAM, SDRAM, or the like, read-only memory (ROM), such as PROM, EPROM, EEPROM, NAND flash, NOR flash, or the like. Further, the power component 212 may be disposed in the housing 202 and may be configured to provide power to the other components. The power component 212 may include one or more batteries.

To manage the communications, the communication node 200 may utilize the one or more encoding components 208, which may include one or more transducers, and one or more decoding components 210 within the housing 202. The encoding components 208 may be disposed within the housing 202 and may be configured to generate an acoustic tones and/or to induce the acoustic tone within a tone transmission medium. The one or more decoding components 210, which may include one or more transducers, may be disposed within the housing 202 and may be configured to receive acoustic tones from the tone transmission medium. The encoding and decoding components 208 and 210 may include instructions stored in memory and utilized to perform the generation of the acoustic tones or decoding of the acoustic tones along with compression or decompression of the data packets into the acoustic tones. The encoding component 208 and decoding component 210 may utilize the same transducer in certain configurations.

The one and/or more sensing components 214 may be configured to obtain sensing data and communicate the obtained measurement data to other communication nodes. By way of example, the sensing components 214 may be configured to obtain pressure measurements, temperature measurements, fluid flow measurements, vibration measurements, resistivity measurements, capacitance measurements, strain measurements, acoustics measurements, stimulation and/or hydraulic fracture properties measurements, chemicals measurements, position measurements and other suitable measurements.

In yet another exemplary configuration, FIG. 2B is an exemplary cross sectional diagram of a communications node 250 that may be used in the system. The view of the communication node 250 is along the longitudinal axis. The communications node 250 includes a housing 252, which may be fabricated from carbon steel or other suitable material to avoid corrosion at the coupling. The housing 252 is dimensioned to provide sufficient structural strength to protect internal components and other electronics disposed within the interior region. By way of example, the housing 252 has an outer wall 260, which may be about 0.2 inches (0.51 centimeters (cm)) in thickness. A cavity 262 houses the electronics, including, by way of example and not of limitation, a power source 254 (e.g., one or more batteries), a power supply wire 264, a first transducer 256, a second transducer 258, and a circuit board 266. The circuit board 266 may preferably include a micro-processor or electronics module that processes acoustic signals. The communication nodes may contain two or more processor or microprocessors, as a preferred configuration. Also, the transducers 256 and 258 may be electro-acoustic transducers.

For communication between communication nodes, the first transducer 256 and the second transducer 258 may be configured to convert acoustical energy to electrical energy (or vice-versa) and are acoustically coupled with outer wall 260 on the side attached to the tubular member. As an example, the first electro-acoustic transducer 256, which may be configured to receive acoustic signals, and a second electro-acoustic transducer 258, which may be configured to transmit acoustic signals, are disposed in the cavity 262 of the housing 252. The first and second electro-acoustic transducers 256 and 258 provide a mechanism for acoustic signals to be transmitted and received from node-to-node, either up the wellbore or down the wellbore. In certain configurations, the second electro-acoustic transducer 258, configured to serve as a transmitter, of intermediate communications nodes 250 may also produce acoustic telemetry signals. Also, an electrical signal is delivered to the second electro-acoustic transducer 258 via a driver circuit. By way of example, a signal generated in one of the transducers, such as the second electro-acoustic transducer 258, passes through the housing 252 to the tubular member, and propagates along the tubular member to other communications nodes. As a result, the transducers that generate or receive acoustic signals may be a magnetostrictive transducer (e.g., including a coil wrapped around a core) and/or a piezoelectric ceramic transducer. Regardless of the specific type of transducer, the electrically encoded data are transformed into a sonic wave that is carried through the walls of a tubular member in the wellbore. Accordingly, the transducers may be configured to only receive signals, only transmit signals or to receive signals and to transmit signals.

Further, the internal components of the communication nodes 250 may include a protective layer 268. The protective layer 268 encapsulates the electronics circuit board 266, the cable 264, the power source 254, and transducers 256 and 258. This protective layer 268 may provide additional mechanical durability and moisture isolation. The communications nodes 250 may also be fluid sealed within the housing 252 to protect the internal electronics from exposure to undesirable fluids and/or to maintain dielectric integrity within the voids of a housing. One form of protection for the internal electronics is available using a potting material.

To secure the communication node to the tubular member, the intermediate communications nodes 250 may also optionally include a shoe 270. More specifically, the intermediate communications nodes 250 may include a pair of shoes 270 disposed at opposing ends of the wall 260. Each of the shoes 270 provides a beveled face that helps prevent the node 250 from hanging up on an external tubular body or the surrounding earth formation, as the case may be, during run-in or pull-out. The communication node 250 may also have an optional acoustic coupling material (not shown) between the face that connects the housing to the tubular and the tubular itself.

To enhance the performance, the communication nodes may be configured to manage different types of communication networks (e.g., wireless networks and/or wired networks). For example, a communication node may be configured to operate with different types of wireless networks, such as low frequency, high frequency and/or radio frequency. Accordingly, the communication nodes may be configured to communicate with each of the types of wireless networks and/or may be configured to transmit with one type of wireless network and receive with another type of wireless network. In certain configurations, the acoustic waves may be communicated in asynchronous packets of information comprising a plurality of separate tones. In other configurations, the acoustic telemetry data transfer may involve multiple frequency shift keying (MFSK). Any extraneous noise in the signal is moderated by using well-known analog and/or digital signal processing methods. This noise removal and signal enhancement may involve conveying the acoustic signal through a signal conditioning circuit using, for example, one or more bandpass filters.

Figure 3:
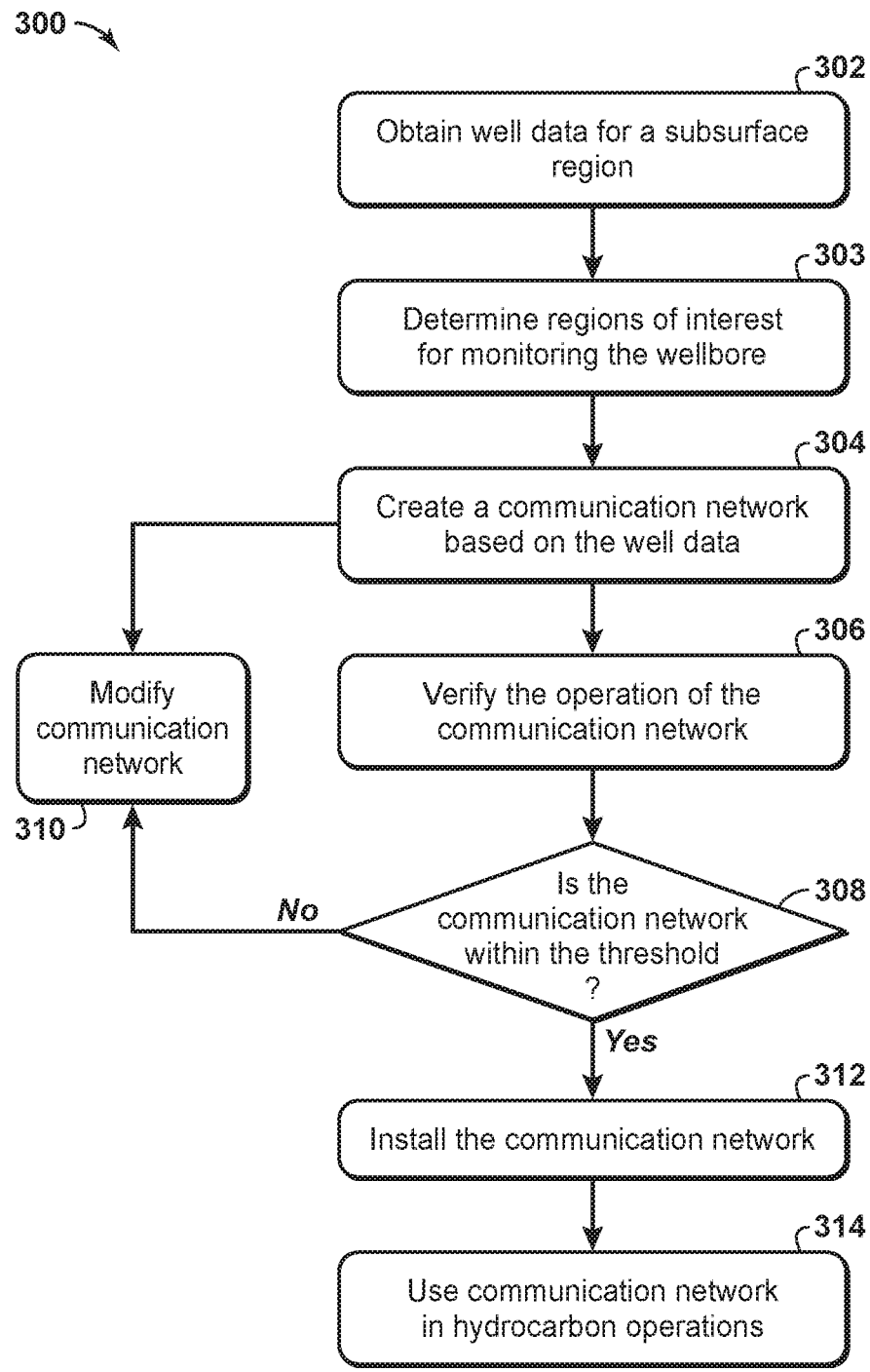
FIG. 3 is an exemplary flow chart in accordance with an embodiment of the present techniques.

FIG. 3 is an exemplary flow chart 300 in accordance with an embodiment of the present techniques. The flow chart 300 is a method for creating, installing and using a communication network for a wellbore. The communication network may include wireless networks, wired networks and any combination thereof. The method may include determining and constructing a communication network that includes the use of two or more types of networks (e.g., wireless networks and/or wired networks) for use in a wellbore, as shown in blocks 302 to 304. Then, the communication network may be verified and modified, as shown in blocks 306 to 310, and the communication network may be used for hydrocarbon operations, as shown in blocks 312 to 314.

To begin, the method involves determining and constructing a communication network that includes the use of two or more types of networks for use in a wellbore, as shown in blocks 302 to 304. At block 302, well data for a subsurface region is obtained. The well data may include seismic data, vibration data, acoustic data, electromagnetic data, resistivity data, gravity data, well log data, core sample data, and combinations thereof. Further, the well data may also include temperature, pressures, strain and other similar properties. The well data may also include the data associated with the equipment installed within the wellbore and the configuration of the wellbore equipment. For example, the well data may include the composition of the tubular members, thickness of the tubular members, length of the tubular members, fluid composition within the wellbore, formation properties, cementation within the wellbore and/or other suitable properties associated with the wellbore. The well data may be obtained from memory or from the equipment in the wellbore. At block 303, regions of interest are determined for monitoring the wellbore. The determining the regions of interest may include determining locations for sensing measurements based on the well design or identified subsurface regions. At block 304, a communication network is created based on the well data. The communication network may be configured to manage different types of wireless networks and/or different types of wired networks. For example, the communication network may be configured to operate different types of wireless networks, such as low-frequency, high-frequency and/or radio frequency. In addition to the wireless networks, the communication network may include different types of wired networks. The creation of the communication network may include performing a simulation with a configuration of communication nodes, which may include modeling specific frequencies and/or use of certain communication node types within specific zones or segments of the wellbore. The simulation may include modeling the tubular members, the exchange of data packet via signals between communication nodes and/or other aspects. The simulation results may include the computation of time-varying fluid pressure and fluid compositions and the prediction of signal travel times within the wellbore. Performing the simulation may also include modeling fluid, modeling signal transmissions and/or structural changes based on the wireless network. In addition, the creation of the communication network may include installing and configuring the communication nodes in the communication network in a testing unit. The testing unit may be a system that includes one or more tubular members and the associated communication nodes distributed along the tubular members within a housing of the testing unit. The testing unit may also contain a fluid, solid, granular material, gas, or mixtures disposed around the tubular member within the housing.

Then, the communication network may be verified and modified, as shown in blocks 306 to 310. At block 306, the operation of the communication network is verified. The verification of the communication network may include coupling the communication nodes to wellbore equipment, such as tubular members, joints, and/or other subsurface equipment. The verification of the communication network may include performing testing and/or verification of the communication nodes in the proposed wireless network configuration, which is installed in the testing unit. At block 308, a determination is made whether the wireless network is within a threshold. The determination may include verifying the operation of the communication nodes, verification of the redundancy of the wireless network. If the wireless network is not within the threshold, the wireless network may be modified, as shown in block 310. The modification of the wireless network may include adding communication nodes, adjusting the location of communication nodes, adjusting the communication settings, reconfiguring the network or communication settings (e.g., at least the default settings) without necessarily changing the communication node between high-frequency and low-frequency, and/or adjusting the wireless network type of communication nodes utilized at one or more zones of the wellbore. If the communication network is within the threshold, the communication network may be installed, as shown in block 312.

The communication network may be used for hydrocarbon operations, as shown in blocks 312 to 314. At block 312, the communication network may be installed. The installation of the communication network may include securing the communication nodes to tubular members in the wellbore or subsurface equipment, verifying the operation of the communication nodes once installed and/or disposing the communication nodes within the wellbore. At block 314, the communication network may be used in hydrocarbon operations. The hydrocarbon operations may include hydrocarbon exploration operations, hydrocarbon development operations, and/or hydrocarbon production operations. The hydrocarbon operations may include monitoring wellbore data or along the tubular members. For example, the communication network may be used to estimate well performance prediction. As another example, the communication network may be used to adjust hydrocarbon production operations, such as installing or modifying a well or completion, monitoring a seal in annulus such as cement, modifying or adjusting drilling operations and/or installing or modifying a production facility. Further, the results may be utilized to predict hydrocarbon accumulation within the subsurface region; to provide an estimated recovery factor; adjust perforation operations and/or to determine rates of fluid flow for a subsurface region. The production facility may include one or more units to process and manage the flow of production fluids, such as hydrocarbons and/or water, from the formation. Once the operations are complete, the operations may involve shutting down network telemetry operations, reconfiguring the network for a different activity, and/or continuing to monitor the subsurface region once the operations are complete.

Beneficially, this method provides an enhancement in the production, development, and/or exploration of hydrocarbons. In particular, the method may be utilized to enhance communication within the wellbore by providing a specific configuration that optimizes communication. Further, the enhanced communications may involve less computational effort, may involve less interactive intervention, and/or may be performed in a computationally efficient manner. As a result, this may provide enhancements to production at lower costs and lower risk.

The method may be modified to provide for configuration changes prior to installation, during installation or after installation. For example, the modification to the configuration of the communication nodes may be performed prior to block 312, during the performance of installation in block 312 or during performance of using of the communication network in hydrocarbon operations in block 314. The modifications may include changing the communication settings within one or more communication nodes, adjusting the frequencies utilized by the communication nodes and/or adjusting the locations of communication nodes along the tubular members. The modifications prior to installation may be based on data measured in a testing unit, while the modifications during the installation may be based on the conditions and the modifications during the operations may be based on the conditions or detection of a network event. The modifications may be based on communications from other devices, such as hydrophone in a wellbore and/or a pig within a pipeline. These communication devices may provide longer range communications than conventionally utilized within these environments. As a specific example, the communication nodes may be configured to receive communication signals from a communication device, such as a hydrophone or a designated communication node, transmitting in a band (e.g., lower frequency band) without involving reconfiguration of any network devices, such as the communication nodes.

Figure 4:
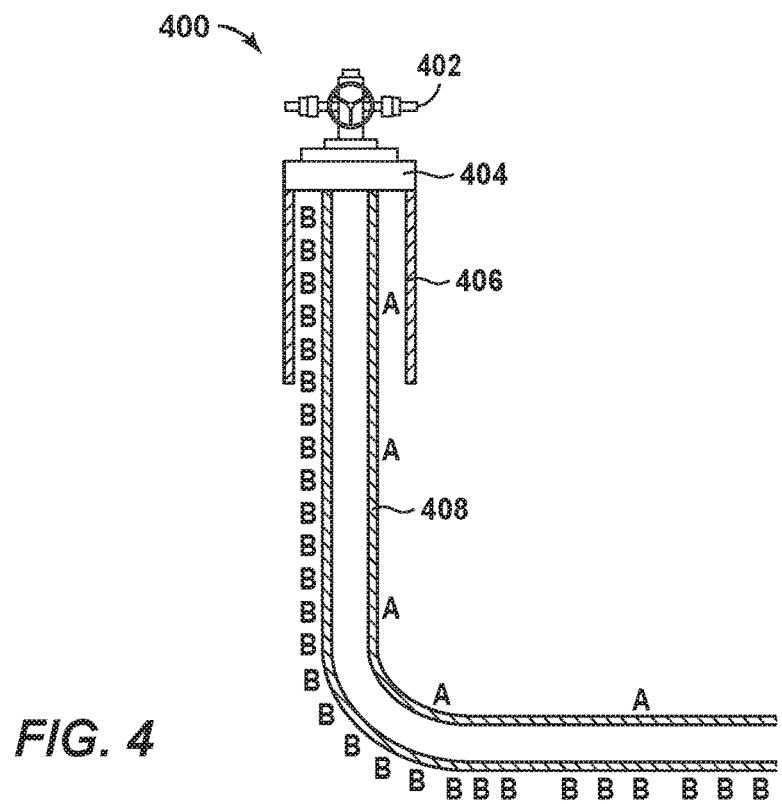
FIG. 4 is an exemplary diagram of an acoustic communication system within a well.
Figure 5:
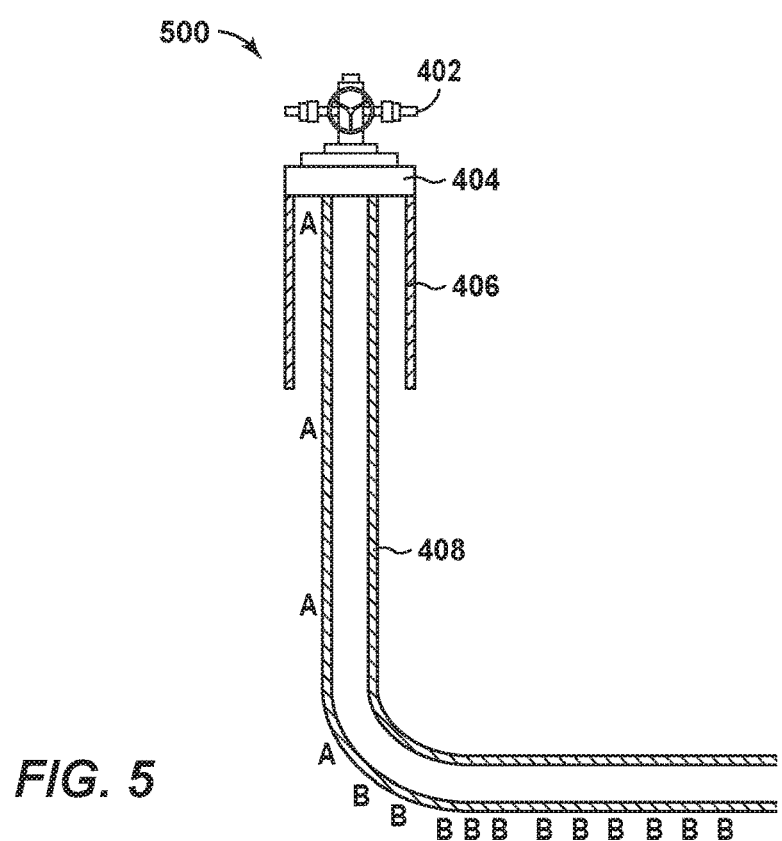
FIG. 5 is another exemplary diagram of an acoustic communication system within a well.
Figure 6:
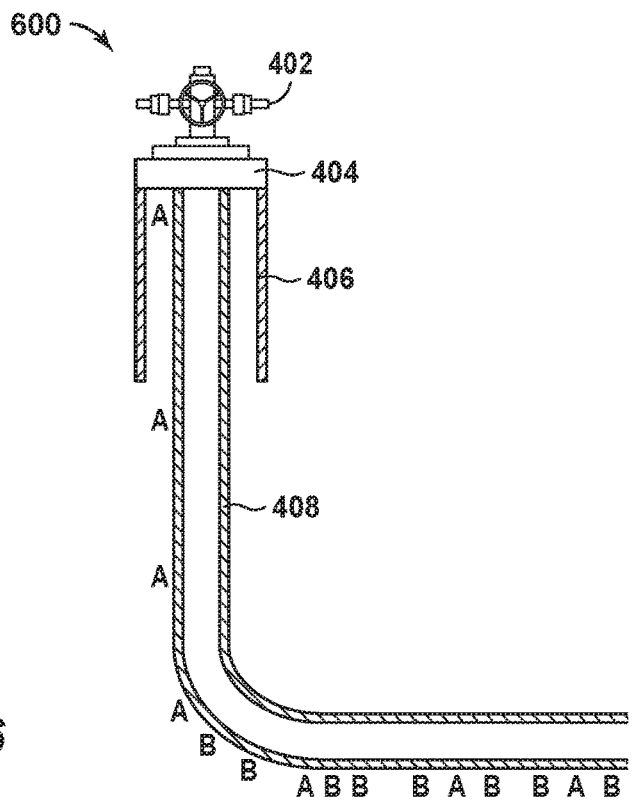
FIG. 6 is yet another exemplary diagram of an acoustic communication system within a well.
Figure 7:
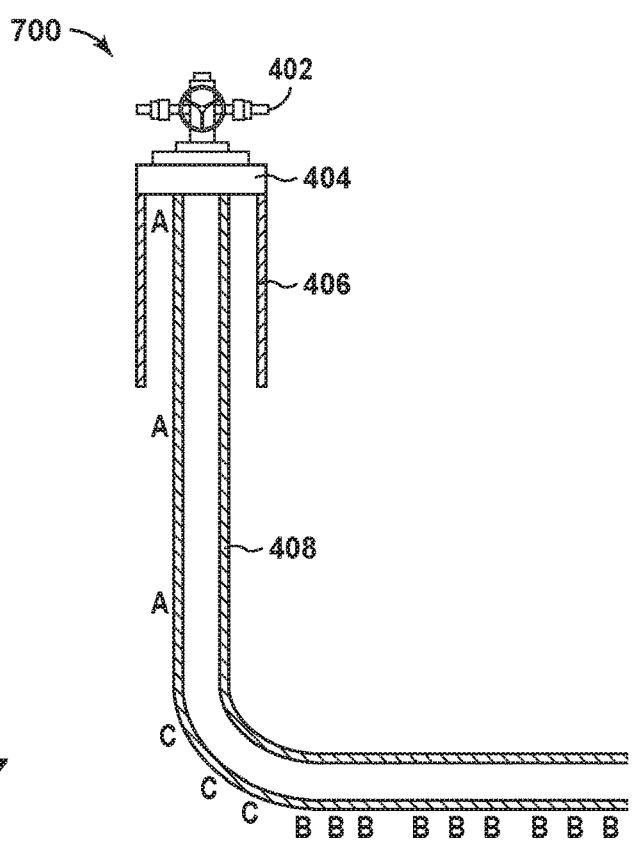
FIG. 7 is still yet another exemplary diagram of an acoustic communication system within a well.

As noted in FIG. 3, the communication network generated in block 304 and used in performing the hydrocarbon operations may involve various configurations. By way of example, the communication network may involve one or more of the configurations described further in FIGS. 4 to 7. For example, FIG. 4 is an exemplary diagram 400 of an acoustic communication system within a well. FIG. 5 is another exemplary diagram 500 of an acoustic communication system within a well, which uses two or more types of communication networks, which may include wireless networks and/or wired networks. FIG. 6 is yet another exemplary diagram 600 of an acoustic communication system within a well. FIG. 7 is still yet another exemplary diagram 700 of an acoustic communication system within a well. In each of these diagrams 400, 500, 600 and 700, similar reference characters may be used to represent similar equipment or components within the system. The wireless network may include two or more types of wireless acoustic telemetry communication and sensing communication nodes, such as low-frequency communication nodes; high-frequency communication nodes and radio-frequency communication nodes. The use of a communication network with multiple types of wireless networks (e.g., high and low frequency acoustic and/or vibration telemetry, or acoustic telemetry combined with radio frequency) may provide flexibility in the operation of the wireless network. In addition, the communication network may include different types of physical or wired networks, as well. The physical network may include a cable, an electrical conductor or a fiber optic cable. This may involve additional piezoelectric transducers, vibration generation capabilities, piezoelectric and radio frequency antennas.

As a first configuration, FIG. 4 is an exemplary diagram 400 of an acoustic communication system within a well. Specifically, the communication network includes various communication nodes A associated with a first type of wireless network (e.g., a low-frequency wireless network) and communication nodes B associated with a second type of wireless network (e.g., a high-frequency wireless network). The well includes a wellhead 402 along with a packer 404, which are configured to manage the flow of fluids from the wellbore. Within the wellbore, a surface casing 406 is disposed and may be secured to the formation by cement (not shown), while a production tubing 408 extends into the wellbore to form the fluid passage through the surrounding subsurface regions into the internal portion of the production tubing 408. In this configuration, the communication nodes A are low-frequency communication nodes, which are disposed on the outer surface of the production tubing 408. This configuration may involve spacing the communication nodes A at distances that are in a specific portion of the communication range to provide redundancy within the wellbore. Further, the communication nodes B are high-frequency communication nodes (e.g., high frequency higher speed ultrasonic telemetry nodes), which are disposed on the outer surface of the production tubing 408.

In addition, in certain configurations, the communication nodes A or B may involve spacing the communication nodes A or B for the respective networks, at distances that are in a specific portion of the communication range to provide redundancy within the wellbore. The communication range may vary based on the type of wireless communication nodes used for the respective communication nodes. For example, the adjacent communication nodes A or B may be spaced apart at a distance of one half the communication range, one third of the communication range or one fourth of the communication range. As another example, the adjacent communication nodes A or B, respectively, may be spaced apart at a distance between 30 percent of the communication range and 80 percent of the communication range; between 40 percent of the communication range and 70 percent of the communication range; between 45 percent of the communication range and 55 percent of the communication range.

In addition, an alternative configuration may include a combination of wired network with a wireless network. For example, the communication nodes A may be wired communication nodes that form a wired network, while the communication nodes B may be a wireless network that form the wireless network.

To lessen the number of communication nodes utilized, FIG. 5 is an exemplary diagram 500 of an acoustic communication system within a well, which is a second configuration. Specifically, the downhole communication network includes various communication nodes B, which are high-frequency communication nodes, and communication nodes A, which are low-frequency communication nodes. Similar to FIG. 4, the well includes a wellhead 402, a packer 404, a surface casing 406 and a production tubing 408. In this configuration, the communication nodes B and the communication nodes A are disposed on the outer surface of the production tubing 408. In this configuration, the communication nodes A are used to communicate through portions of the wellbore that do not involve obtaining measurements, while the communication nodes B may be used for locations that sensing or data measurements are being performed. Similar to the discussion above, the configuration may involve spacing the communication nodes B and communication nodes A at distances that are a specific portion of the communication range to provide redundancy within the wellbore.

In addition, an alternative configuration may include a combination of wired network with a wireless network. For example, the communication nodes A may be wired communication nodes that form a wired network, while the communication nodes B may be a wireless network that form the wireless network. The wired network may be utilized within the vertical sections of the wellbore, but the wireless network may be utilized in horizontal sections of the wellbore.

To further enhance the communication nodes operation, FIG. 6 is an exemplary diagram 600 of an acoustic communication system within a well, which is a third configuration. Specifically, the communication network includes various communication nodes B, which are high-frequency communication nodes, and communication nodes A, which are low-frequency communication nodes. Similar to FIGS. 4 and 5, the well includes a wellhead 402, a packer 404, a surface casing 406 and a production tubing 408. In this configuration, the communication nodes B and the communication nodes A are disposed on the outer surface of the production tubing 408. The communication nodes A are intermixed with the communication nodes B to operate as communication hubs for the communication nodes B. Similar to the discussion above, the configuration may involve spacing the communication nodes B and communication nodes A at distances that are a specific portion of the communication range to provide redundancy within the wellbore.

In addition, an alternative configuration may include a combination of wired network with a wireless network. For example, the communication nodes A may be wireless communication nodes that form a wireless network, while the communication nodes B may be a wired network that form the wired network. The wired network may be utilized within the specific sections or regions of interest, while the wireless network may be utilized in other sections of the wellbore. This configuration may lessen installation problems with wired networks, but provide greater cover with the wired communication nodes at specific locations within the wellbore.

As another enhancement of the communication nodes operation, FIG. 7 is an exemplary diagram 700 of an acoustic communication system within a well, which is a fourth configuration. Specifically, the communication network includes various communication nodes B, which are high-frequency communication nodes; communication nodes A, which are low-frequency communication nodes; and communication nodes C, which are radio-frequency communication nodes. Similar to FIGS. 4, 5 and 6, the well includes a wellhead 402, a packer 404, a surface casing 406 and a production tubing 408. In this configuration, the communication nodes B, communication nodes A and the communication nodes C are disposed on the outer surface of the production tubing 408. The communication nodes C are disposed between the communication nodes A and the communication nodes B to manage the communication between the different types of communication nodes or where the other communication nodes A and B do not provide optimal performance. Similar to the discussion above, the configuration may involve spacing the communication nodes A, B and C at distances that are a specific portion of the communication range to provide redundancy within the wellbore.

As an alternative configuration, the communication network may include a combination of wired network with a wireless network. For example, the communication nodes A may be wired communication nodes that form a wired network, while the communication nodes B and C may be different wireless networks that form the respective wireless networks. The wired network may be utilized within the vertical sections, while the wired network may be utilized in other sections of the wellbore. This configuration may lessen installation problems with wired networks.

Figure 8A:
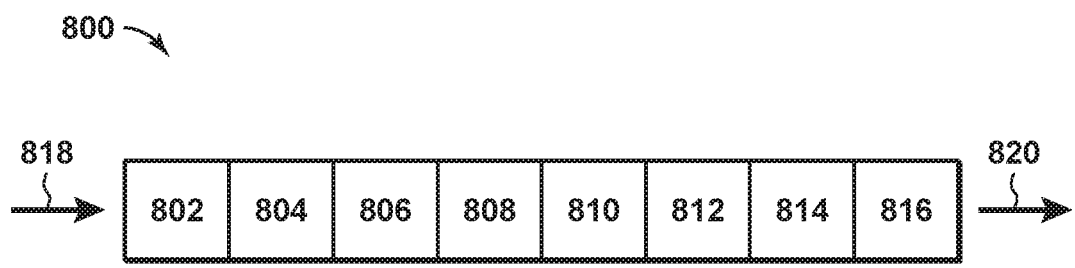
FIGS. 8A and 8B are exemplary diagrams of buffer configurations for use in the communication nodes.
Figure 8B:
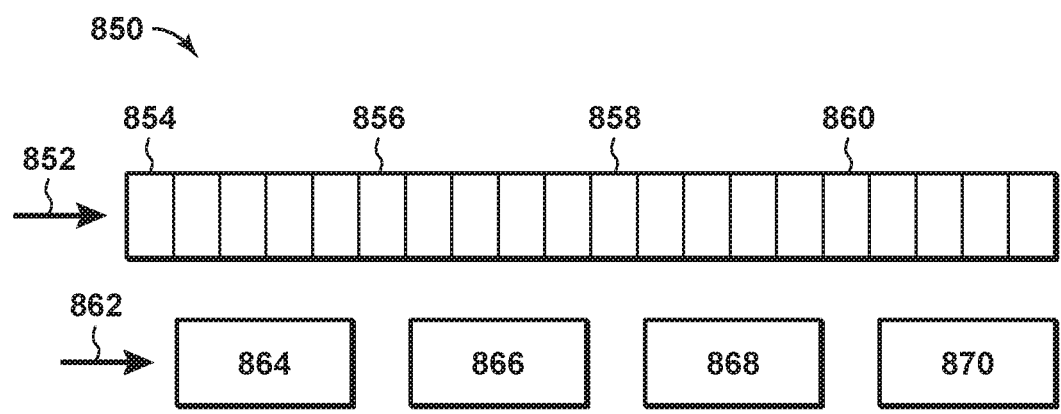

FIGS. 8A and 8B are exemplary diagrams of buffer configurations for use in the communication nodes. As may be appreciated, one or more communication nodes may be configured to act as an interface between the different types of communication networks in an environment (e.g., downhole environment, subsea environment or pipeline environment). The interface communication node may be configured to manage the boundary between different types of communication networks, such as a high-frequency network and/or a low-frequency network and/or wireless and wired networks.

One configuration of interface communication nodes may include buffering configurations. The buffering configuration may involve the interface communication node having sufficient memory to be able to receive data from the high-frequency network at full speed, while the interface communication node may simultaneously transmit data packets on a low-frequency network at full speed. As shown in FIG. 8A, a suitable buffer 800 acts as a queue to which data is added at one end, as shown by arrow 818, when received, then removed at the other end, as shown by arrow 820, when transmitted. For example, the data received may be stored in the order of blocks 802, 804, 806, 808, 810, 812, 814 and 816 (e.g., block 802 is the newest data packet received and block 816 is the oldest data packet received), while the data transmitted may be removed for transmission in the order of blocks 816, 814, 812, 810, 808, 806, 804 and 802 (e.g., block 816 is the first data packet to be transmitted and block 802 is the last data packet to be transmitted). The buffer memory may be configured to perform queue behaviors, which may use compression or may not use compression. Buffering and compression may occur when transmitting from high-frequency to low-frequency (e.g., from fast to slow).

A primary advantage with this configuration is the ability the low-frequency and high-frequency networks to operate at full speed (and simultaneously), resulting in more efficient utilization of the communication (e.g., channel), as well as significant energy savings for the high-frequency network because it may complete transmission and enter a sleep mode quickly. Another advantage of this configuration is the ability to compress or summarize the accumulated data (e.g., data packets) prior to transmission on the low-frequency network, which may mitigate the slower performance of the low-frequency network by reducing the volume of data transmitted over the low-frequency network. In this configuration, the configuration has to have sufficient memory to accommodate the longest possible transmission from the high-frequency network (or conversely, the limitation of high-frequency network transmission to the size of memory in the respective interface communication node). The ability to apply in-place compression or summarization to the pending data buffer is different because typical cached data is treated as static from the moment it is stored in the cache until the moment it is retrieved from the cache. The liability of accumulated data (and increased latency) may be reduced or eliminated by using in-place compression or summarization for performance improvement and energy savings on the slower network (e.g., low-frequency network).

The interface communication node may include one or more compression algorithms. The compression algorithms may include one or more of a Lempel-Ziv (LZ) compression algorithm, a Lempel-Ziv-Welch (LZW) compression algorithm, a Huffman encoded (e.g., SHRI, LZX) compression algorithm, a run-length encoding compression algorithm, a discrete cosine transform (DCT) compression algorithm, a discrete wavelet transform (DWT) compression algorithm, a vector quantization compression algorithm, fractal compression algorithm, and/or another compression algorithm. The different compression algorithms may include tuning or optimizing compression ratio with energy consumption.

Another configuration of interface communication nodes may include pacing configurations. The pacing configurations may include managing the transmission on different types of wireless networks, such as the high-frequency network and/or low-frequency network. By way of example, an interface communication node may involve transmitting on the high-frequency network every Nth symbol time or interval to account for the slower data transmission of the low-frequency network. As an example, the interface communication node may involve transmitting in one of a plurality of time intervals from a first wireless network based on the time interval for the second wireless network, which is slower than the first wireless network. As shown in FIG. 8B, data packets on the high-frequency network are shown along arrow 852, while data packets on the low-frequency network are shown along arrow 862. In this example, the interface communication node may involve transmitting in one of the five time intervals from the high-frequency network based on a single time interval for the low-frequency wireless network, In the high-frequency network, the data packets 854, 856, 858 and 860 include data, while the other data packets between the data packets 854, 856, 858 and 860 do not include information. The low-frequency network may include data packets 864, 866, 868 and 870 is associated with the data packets 854, 856, 858 and 860, respectively. This configuration provides a mechanism to maintain the pace between incoming and outgoing data packets on the respective networks. Accordingly, in this configuration, the high-frequency network may continue to operate normally when not transmitting to the interface communication node. This approach does not limit the size of the transmission from the high-frequency network and does not require excessive buffer memory on the interface communication node. The transmissions on the high-frequency network may involve the high-frequency communication nodes, which may involve transmitting in operational mode and then entering the sleep mode between transmitted symbols, thereby saving significant energy.

In certain configurations, the interface communication node may also be configured to utilize aliasing to manage the communication exchange between the high-frequency network and the low-frequency network. The communication network may use aliasing to enable communication nodes operating at low-frequency effective clock speeds to be used with the communication nodes operating at high-frequency effective clock speeds. As a result, the communication node may be configured to be more energy efficient for transmitting signals by using a high-speed effective clock speed and receiving signals by using a low-speed effective clock speed.

In other configurations, the communication nodes may include various different configurations. By way of example, a communication node may include a single transducer for low-frequency acoustic communication and high-frequency acoustic communication. Other communication nodes may include a separate low-frequency acoustic transducer and a high frequency acoustic transducer, or a combination of radio frequency transducers along with low-frequency and/or high-frequency vibration, and software and/or control electronics for transmission, sensitive detection, timing adjustment, and sensing. Also, the communication nodes may include robust algorithms for manually switching or auto-switching the network physical layer types (low-frequency, high-frequency, radio frequency, and other suitable types of wireless networks) based on changes in tubular, flowing media, formation, or downhole devices themselves, which may hinder one or more of the available physical communication channels (propagating wave type).

Persons skilled in the technical field will readily recognize that in practical applications of the disclosed methodology, it is partially performed on a computer, typically a suitably programmed digital computer or processor based device. Further, some portions of the detailed descriptions which follow are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. In the present application, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "processing" or "computing", "calculating", "comparing", "determining", "displaying", "copying," "producing," "storing," "adding," "applying," "executing," "maintaining," "updating," "creating," "constructing" "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Embodiments of the present techniques also relate to an apparatus for performing the operations herein. This apparatus, such as the control unit or the communication nodes, may be specially constructed for the required purposes, or it may comprise a general-purpose computer or processor based device selectively activated or reconfigured by a computer program stored in the computer (e.g., one or more sets of instructions). Such a computer program may be stored in a computer readable medium. A computer-readable medium includes any mechanism for storing or transmitting information in a form readable by a machine (e.g., a computer). For example, but not limited to, a computer-readable (e.g., machine-readable) medium includes a machine (e.g., a computer) readable storage medium (e.g., read only memory ("ROM"), random access memory ("RAM"), magnetic disk storage media, optical storage media, flash memory devices, etc.), and a machine (e.g., computer) readable transmission medium (electrical, optical, acoustical or other form of propagated signals (e.g., carrier waves, infrared signals, digital signals, etc.)).

Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present techniques are in no way limited to implementation in any specific operating system or environment.

By way of example, the control unit may include a computer system that may be used to perform any of the methods disclosed herein. A central processing unit (CPU) is coupled to system bus. The CPU may be any general-purpose CPU, although other types of architectures of CPU (or other components of exemplary system) may be used as long as CPU (and other components of system) supports the inventive operations as described herein. The CPU may execute the various logical instructions according to disclosed aspects and methodologies. For example, the CPU may execute machine-level instructions for performing processing according to aspects and methodologies disclosed herein.

The computer system may also include computer components such as a random access memory (RAM), which may be SRAM, DRAM, SDRAM, or the like. The computer system may also include read-only memory (ROM), which may be PROM, EPROM, EEPROM, NAND flash, NOR flash, or the like. RAM and ROM hold user and system data and programs, as is known in the art. The computer system may also include an input/output (I/O) adapter, a graphical processing unit (GPU), a communications adapter, a user interface adapter, and a display adapter. The I/O adapter, the user interface adapter, and/or communications adapter may, in certain aspects and techniques, enable a user to interact with computer system to input information.

The I/O adapter preferably connects a storage device(s), such as one or more of hard drive, compact disc (CD) drive, floppy disk drive, tape drive, etc. to computer system. The storage device(s) may be used when RAM is insufficient for the memory requirements associated with storing data for operations of embodiments of the present techniques. The data storage of the computer system may be used for storing information and/or other data used or generated as disclosed herein. The communications adapter may couple the computer system to a network (not shown), which may include the wireless network for the wellbore and a separate network to communicate with remote locations), which may enable information to be input to and/or output from system via the network (for example, a wide-area network, a local-area network, a wireless network, any combination of the foregoing). User interface adapter couples user input devices, such as a keyboard, a pointing device, and the like, to computer system. The display adapter is driven by the CPU or GPU to control, through a display driver, the display on a display device.

The architecture of system may be varied as desired. For example, any suitable processor-based device may be used, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may use any number of suitable structures capable of executing logical operations according to the embodiments.

As may be appreciated, the method may be implemented in machine-readable logic, such that a set of instructions or code that, when executed, performs the instructions or operations from memory. By way of example, the computer system includes a processor; an input device and memory. The input device is in communication with the processor and is configured to receive input data associated with a subsurface region. The memory is in communication with the processor and the memory has a set of instructions, wherein the set of instructions, when executed, are configured to perform various steps.

By way of example, the set of instructions, when executed by the processor, may be configured to perform steps to enhance hydrocarbon operations. The set of instructions may be configured to: communicate with signals (e.g., high-frequencies signals and/or low-frequencies signals); communicate with low radio frequencies signals and/or high frequency radio frequencies signals and any combination thereof; transmit and receive signals that are less than or equal to (≤) 20 kilohertz, in the range between 100 hertz and 20 kilohertz, or in the range between 1 kilohertz and 20 kilohertz; transmit and receive signals that are greater than (>) 20 kilohertz, in the range between greater than 20 kilohertz and 1 megahertz, or in the range between greater than 20 kilohertz and 500 kilohertz; to communicate with one or more of the first plurality of communication nodes and the second plurality of communication nodes; exchange data packets between the first type of communication network and second type of communication network; to compress data being passed from the first type of communication network to the second type of communication network, wherein the first type of communication network operates in a higher frequency range than the second type of communication network; store received data packets from the first type of communication network and the second type of communication network; transmit data packets to the first type of communication network from the second type of communication network; and transmit data packets to the second type of communication network from the first type of communication network; simultaneously transmit data packets to the first type of communication network from the second type of communication network and transmit data packets to the second type of communication network from the first type of communication network; store received data packets from the first type of communication network and the second type of communication network; transmit data packets to the first type of communication network from the second type of communication network; and/or transmit data packets to the second type of communication network from the first type of communication network.

It should be understood that the preceding is merely a detailed description of specific embodiments of the invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents. It is also contemplated that structures and features embodied in the present examples can be altered, rearranged, substituted, deleted, duplicated, combined, or added to each other. As such, it will be apparent, however, to one skilled in the art, that many modifications and variations to the embodiments described herein are possible. All such modifications and variations are intended to be within the scope of the present invention, as defined by the appended claims.

The invention claimed is:

1. A method of communicating data among a plurality of communication nodes along one or more tubular members, the method comprising:
    providing a communication network that comprises a first type of communication network and a second type of communication network;
    disposing a first plurality of communication nodes along the one or more tubular members to form the first type of communication network;
    disposing a second plurality of communication nodes along the one or more tubular members to form the second type of communication network;
    obtaining measurements along the one or more tubular members;
    communicating the obtained measurements via signals over the first type of communication network and the second type of communication network to a central processor;
    exchanging data packets between the first type of communication network and the second type of communication network via one or more interface communication nodes;
    wherein the one or more interface communication nodes include a memory and at least one compression algorithm that compresses the data packets being passed from the first type of communication network to the second type of communication network, wherein the first type of communication network is in a higher frequency range than the second type of communication network;
    wherein the memory stores the data packets received from the first type of communication network and the second type of communication network to transmit the data packets to the first type of communication network from the second type of communication network and to transmit the data packets to the second type of communication network from the first type of communication network; and
    performing hydrocarbon operations with the obtained measurements.

2. The method of claim 1, wherein the first type of communication network and the second type of communication network are different types of wireless networks.

3. The method of claim 2, further comprising:
    exchanging high-frequency signals via the second plurality of communication nodes; and
    one of exchanging low-frequency signals with the first plurality of communication nodes, exchanging acoustic high-frequency signals or acoustic low-frequency signals with the first plurality of communication nodes; exchanging vibration high-frequency signals or vibration low-frequency signals with the first plurality of communication nodes and exchanging low radio frequency signals or high radio frequency signals with the first plurality of communication nodes and any combination thereof.

4. The method of claim 3, wherein the low-frequency signals are less than or equal to (≤) 20 kilohertz.

5. The method of claim 3, wherein the low-frequency signals are in a range between 100 hertz and 20 kilohertz.

6. The method of claim 3, wherein the low-frequency signals are in a range between 1 kilohertz and 20 kilohertz.

7. The method of claim 3, wherein the high-frequency signals are greater than (>) 20 kilohertz.

8. The method of claim 3, wherein the high-frequency signals are in a range between greater than 20 kilohertz and 1 megahertz.

9. The method of claim 3, wherein the high-frequency signals are in a range between greater than 20 kilohertz and 500 kilohertz.

10. The method of claim 1, wherein the first type of communication network is a wired network and the second type of communication network is a wireless network.

11. The method of claim 1, wherein the first plurality of communication nodes comprise two or more low-frequency communication nodes and the first type of communication network operates with low-frequency signals; and the second plurality of communication nodes comprise two or more high-frequency communication nodes and the second type of communication network operates with high-frequency signals.

12. The method of claim 11, wherein the first plurality of communication nodes and the second plurality of communication nodes are disposed along the one or more tubular members to provide redundant communications along the one or more tubular members.

13. The method of claim 11, wherein the first plurality of communication nodes are disposed in unmonitored sections along the one or more tubular members and the second plurality of communication nodes are disposed in monitored sections along the one or more tubular members.

14. The method of claim 11, further comprising a third plurality of communication nodes of a third type of communication network disposed along the one or more tubular members, wherein the third plurality of communication nodes are configured to communicate with one or more of the first plurality of communication nodes and the second plurality of communication nodes.

15. The method of claim 1, wherein the one or more interface communication nodes are configured to simultaneously transmit the data packets to the first type of communication network from the second type of communication network and transmit the data packets to the second type of communication network from the first type of communication network.

16. The method of claim 1, wherein the data packets are transmitted on the first type of communication network at one of a plurality of time intervals and the data packets are transmitted at each time interval of the plurality of time intervals for the second type of communication network to account for a slower data transmission on the second type of communication network.

17. The method of claim 1, further comprising disposing the one or more tubular members within a wellbore and the central processor is located at a surface of the wellbore.

18. The method of claim 1, further comprising disposing the first plurality of communication nodes, the second plurality of communication nodes, and the one or more tubular members along a subsea conduit.

19. The method of claim 1, further comprising disposing the first plurality of communication nodes, the second plurality of communication nodes, and the one or more tubular members along a pipeline.

20. A communication system for communicating data along one or more tubular members, the system comprising:
a first plurality of communication nodes disposed along the one or more tubular members to form a first type of communication network;
a second plurality of communication nodes disposed along the one or more tubular members to form a second type of communication network, wherein the second type of communication network operates at a different frequency range from the first type of communication network; and
a central processor configured to exchange data packets with the first type communication network and the second type of communication network;
one or more interface communication nodes configured to exchange the data packets between the first type of communication network and the second type of communication network;
wherein the one or more interface communication nodes include a memory and at least one compression algorithm configured to compress the data packets being passed from the first type of communication network to the second type of communication network, wherein the first type of communication network operates in a higher frequency range than the second type of communication network; and
wherein the one or more interface communication nodes include memory configured to store the data packets received from the first type of communication network and the second type of communication network to transmit the data packets to the first type of communication network from the second type of communication network and to transmit the data packets to the second type of communication network from the first type of communication network.

21. The system of claim 20, wherein the first type of communication network and the second type of communication network are different types of wireless networks.

22. The system of claim 20, wherein the first plurality of communication nodes comprise one of one or more low-frequency communication nodes, one or more acoustic high-frequencies communication nodes and acoustic low-frequencies communication nodes; one or more vibration high-frequencies communication nodes and vibration low-frequencies communication nodes;
one or more low radio frequencies communication nodes and/or high frequency radio frequencies communication nodes and any combination thereof; and the second plurality of communication nodes comprise one or more high-frequency communication nodes.

23. The system of claim 22, wherein the low-frequency communication nodes are configured to transmit and receive signals that are less than or equal to ($\leq$) 20 kilohertz.

24. The system of claim 22, wherein the low-frequency communication nodes are configured to exchange signals in a range between 100 hertz and 20 kilohertz.

25. The system of claim 22, wherein the low-frequency communication nodes are configured to exchange signals in a range between 1 kilohertz and 20 kilohertz.

26. The system claim 22, wherein the high-frequency communication nodes are configured to transmit and receive signals that are greater than ($>$) 20 kilohertz.

27. The system of claim 22, wherein the high-frequency communication nodes are configured to exchange signals in a range between greater than 20 kilohertz and 1 megahertz.

28. The system of claim 22, wherein the high-frequency communication nodes are configured to exchange signals in a range between greater than 20 kilohertz and 500 kilohertz.

29. The system of claim 20, wherein the first type of communication network is a wired network and the second type of communication network is a wireless network.

30. The system of claim 20, wherein the first plurality of communication nodes comprise two or more low-frequency communication nodes and the first type of communication network operates with low-frequency signals; and the second plurality of communication nodes comprise two or more high-frequency communication nodes and the second type of communication network operates with high-frequency signals.

31. The system of claim 30, wherein the first plurality of communication nodes and the second plurality of communication nodes are disposed along the one or more tubular members to provide redundant communications along the one or more tubular members.

32. The system of claim 31, wherein the first plurality of communication nodes are disposed in unmonitored sections along the one or more tubular members and the second plurality of communication nodes are disposed in monitored sections along the one or more tubular members.

33. The system of claim 30, further comprising a third plurality of communication nodes of a third type of communication network disposed along the one or more tubular members, wherein the third plurality of communication nodes are configured to communicate with one or more of the first plurality of communication nodes and the second plurality of communication nodes.

34. The system of claim 20, wherein the one or more interface communication nodes are configured to simultaneously transmit the data packets to the first type of communication network from the second type of communication network and transmit the data packets to the second type of communication network from the first type of communication network.

35. The system of claim 20, wherein the data packets are transmitted on the first type of communication network at one of a plurality of time intervals and the data packets are transmitted at each time interval of the plurality of time intervals for the second type of communication network to account for a slower data transmission on the second type of communication network.

36. The system of claim 20, wherein the one or more tubular members are disposed within a wellbore.

37. The system of claim 20, wherein the one or more tubular members are disposed within a subsea conduit.

38. The system of claim 20, wherein the one or more tubular members are disposed within a pipeline.

* * * * *